(12) United States Patent
Shimizu et al.

(10) Patent No.: US 8,654,480 B2
(45) Date of Patent: Feb. 18, 2014

(54) MAGNETIC HEAD WITH SPIN TORQUE OSCILLATOR AND MAGNETIC RECORDING HEAD

(75) Inventors: Mariko Shimizu, Yokohama (JP); Hitoshi Iwasaki, Yokosuka (JP); Kenichiro Yamada, Tokyo (JP); Junichi Akiyama, Kawasaki (JP); Masayuki Takagishi, Kunitachi (JP); Tomomi Funayama, Tokorozawa (JP); Masahiro Takashita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/545,601

(22) Filed: Jul. 10, 2012

(65) Prior Publication Data

US 2012/0275060 A1    Nov. 1, 2012

Related U.S. Application Data

(62) Division of application No. 12/232,469, filed on Sep. 17, 2008, now abandoned.

(30) Foreign Application Priority Data

Sep. 25, 2007  (JP) ................................. 2007-247966

(51) Int. Cl.
    *G11B 5/00*    (2006.01)
(52) U.S. Cl.
    USPC ........................................................ 360/128
(58) Field of Classification Search
    USPC .................... 360/128, 125.3, 125.31, 125.71,
                         360/125.74, 313–328
    See application file for complete search history.

(56) References Cited

U.S. PATENT DOCUMENTS

| | | | |
|---|---|---|---|
| 3,899,834 A | 8/1975 | Harrison, Jr. |
| 4,103,315 A | 7/1978 | Hempstead et al. |
| 4,782,415 A | 11/1988 | Vinal |
| 4,945,528 A | 7/1990 | Crasemann |
| 5,499,150 A | 3/1996 | Kawana et al. |
| 5,695,864 A | 12/1997 | Slonczewski |
| 5,748,399 A | 5/1998 | Gill |
| 5,768,066 A | 6/1998 | Akiyama et al. |

(Continued)

FOREIGN PATENT DOCUMENTS

| | | |
|---|---|---|
| JP | 64-070947 | 3/1989 |
| JP | 05-20635 | 1/1993 |

(Continued)

OTHER PUBLICATIONS

X. Zhu and J.-G. Zhu, "Bias-Field-Free Microwave Oscillator Driven by Perpendicularly Polarized Spin Current," IEEE Trans. Magn. vol. 42, p. 2670 (2006).

(Continued)

*Primary Examiner* — Joseph Feild
*Assistant Examiner* — Gustavo Polo
(74) *Attorney, Agent, or Firm* — Nixon & Vanderhye, P.C.

(57) ABSTRACT

An example magnetic head includes a recording pole to generate a recording magnetic field, a spin torque oscillator formed in the vicinity of the recording magnetic pole and a hard bias film provided at both end portions of a bias layer and an oscillation layer of spin torque oscillator. The hard bias film is configured to apply a magnetic field to the bias layer and the oscillation layer.

10 Claims, 24 Drawing Sheets

(56) References Cited

U.S. PATENT DOCUMENTS

| | | | |
|---|---|---|---|
| 5,898,546 A | 4/1999 | Kanai et al. |
| 5,920,447 A | 7/1999 | Sakata et al. |
| 6,011,664 A | 1/2000 | Kryder et al. |
| 6,094,328 A | 7/2000 | Saito |
| 6,153,062 A | 11/2000 | Saito |
| 6,278,576 B1 | 8/2001 | Ogata et al. |
| 6,282,069 B1 | 8/2001 | Nakazawa et al. |
| 6,519,119 B1 | 2/2003 | van der Heijden et al. |
| 6,580,589 B1 | 6/2003 | Gill |
| 6,583,969 B1 | 6/2003 | Pinarbasi |
| 6,591,479 B2 | 7/2003 | Nakazawa et al. |
| 6,608,739 B1 | 8/2003 | Tanaka et al. |
| 6,621,664 B1 | 9/2003 | Trindade et al. |
| 6,697,231 B1 | 2/2004 | Kikuiri |
| 6,785,092 B2 | 8/2004 | Covington et al. |
| 6,809,900 B2 | 10/2004 | Covington |
| 6,836,971 B1 | 1/2005 | Wan |
| 6,927,952 B2 | 8/2005 | Shimizu et al. |
| 6,937,446 B2 | 8/2005 | Kamiguchi et al. |
| 6,977,108 B2 | 12/2005 | Hieda et al. |
| 6,980,469 B2 | 12/2005 | Kent et al. |
| 6,982,845 B2 | 1/2006 | Kai et al. |
| 7,106,555 B2 | 9/2006 | Kikuiri et al. |
| 7,119,990 B2 | 10/2006 | Bajorek et al. |
| 7,120,988 B2 | 10/2006 | Le et al. |
| 7,145,752 B2 | 12/2006 | Ueda et al. |
| 7,154,707 B2 | 12/2006 | Watabe et al. |
| 7,256,955 B2 | 8/2007 | Pokhil et al. |
| 7,397,633 B2 | 7/2008 | Xue et al. |
| 7,461,933 B2 | 12/2008 | Deily et al. |
| 7,466,525 B2 | 12/2008 | Hasegawa et al. |
| 7,471,491 B2 | 12/2008 | Sato et al. |
| 7,473,478 B2 | 1/2009 | Sbiaa et al. |
| 7,486,475 B2 | 2/2009 | Biskeborn |
| 7,504,898 B2 | 3/2009 | Fukuzawa et al. |
| 7,532,433 B2 | 5/2009 | Kawato et al. |
| 7,532,434 B1 | 5/2009 | Schrek et al. |
| 7,593,185 B2 | 9/2009 | Yazawa |
| 7,616,412 B2 | 11/2009 | Zhu et al. |
| 7,675,129 B2 | 3/2010 | Inomata et al. |
| 7,724,469 B2 | 5/2010 | Gao et al. |
| 7,732,881 B2 | 6/2010 | Wang |
| 7,764,136 B2 | 7/2010 | Suzuki |
| 7,791,829 B2 | 9/2010 | Takeo et al. |
| 7,808,330 B2 | 10/2010 | Fukuzawa et al. |
| 7,818,890 B2 | 10/2010 | Duric et al. |
| 7,876,531 B2 | 1/2011 | Bozeman et al. |
| 7,911,882 B2 | 3/2011 | Shimazawa et al. |
| 7,957,098 B2 | 6/2011 | Yamada et al. |
| 8,081,397 B2 | 12/2011 | Funayama et al. |
| 8,139,322 B2 | 3/2012 | Yamada et al. |
| 8,154,825 B2 | 4/2012 | Takashita et al. |
| 8,164,854 B2 | 4/2012 | Takagishi et al. |
| 8,238,058 B2 | 8/2012 | Shimizu et al. |
| 8,238,060 B2 | 8/2012 | Yamada et al. |
| 8,264,799 B2 | 9/2012 | Akiyama et al. |
| 8,270,112 B2 | 9/2012 | Funayama et al. |
| 8,295,009 B2 | 10/2012 | Yamada et al. |
| 8,320,079 B2 | 11/2012 | Iwasaki et al. |
| 8,325,442 B2 | 12/2012 | Koui et al. |
| 8,400,734 B2 | 3/2013 | Yamada et al. |
| 2001/0017746 A1 | 8/2001 | Nishida et al. |
| 2001/0017752 A1 | 8/2001 | Hoshiya et al. |
| 2002/0006013 A1 | 1/2002 | Sato et al. |
| 2002/0014016 A1 | 2/2002 | Kato |
| 2002/0051330 A1 | 5/2002 | Heijden et al. |
| 2002/0075595 A1 | 6/2002 | Sato et al. |
| 2002/0097536 A1 | 7/2002 | Komuro et al. |
| 2002/0136927 A1 | 9/2002 | Hieda et al. |
| 2003/0026040 A1 | 2/2003 | Covington et al. |
| 2003/0090844 A1 | 5/2003 | Shimizu et al. |
| 2004/0070869 A1 | 4/2004 | Nishida et al. |
| 2004/0145828 A1 | 7/2004 | Im |
| 2004/0150912 A1 | 8/2004 | Kawato et al. |
| 2004/0190197 A1 | 9/2004 | Watabe et al. |
| 2004/0228045 A1 | 11/2004 | Hasegawa et al. |
| 2004/0252417 A1 | 12/2004 | Hasegawa et al. |
| 2005/0023938 A1 | 2/2005 | Sato et al. |
| 2005/0088789 A1 | 4/2005 | Hou et al. |
| 2005/0105213 A1 | 5/2005 | Takeo et al. |
| 2005/0110004 A1 | 5/2005 | Parkin et al. |
| 2005/0111137 A1 | 5/2005 | Ju et al. |
| 2005/0193578 A1 | 9/2005 | Toda |
| 2005/0207050 A1 | 9/2005 | Pokhil |
| 2005/0219771 A1 | 10/2005 | Sato et al. |
| 2006/0039089 A1 | 2/2006 | Sato |
| 2006/0171051 A1 | 8/2006 | Wachenschwanz et al. |
| 2006/0187580 A1 | 8/2006 | Samofalov et al. |
| 2006/0198047 A1 | 9/2006 | Xue et al. |
| 2006/0213070 A1 | 9/2006 | Goldsobel et al. |
| 2006/0221507 A1 | 10/2006 | Sato et al. |
| 2007/0063237 A1 | 3/2007 | Huai et al. |
| 2007/0089311 A1 | 4/2007 | Amundson et al. |
| 2007/0109147 A1 | 5/2007 | Fukuzawa et al. |
| 2007/0253122 A1 | 11/2007 | Fukuzawa et al. |
| 2008/0019040 A1 | 1/2008 | Zhu et al. |
| 2008/0112087 A1 | 5/2008 | Clinton et al. |
| 2008/0117545 A1 | 5/2008 | Batra et al. |
| 2008/0129401 A1 | 6/2008 | Fukuzawa et al. |
| 2008/0137224 A1 | 6/2008 | Gao et al. |
| 2008/0144232 A1* | 6/2008 | Kaka et al. ............... 360/324.1 |
| 2008/0150643 A1 | 6/2008 | Suzuki et al. |
| 2008/0165452 A1 | 7/2008 | Bozeman et al. |
| 2008/0180838 A1 | 7/2008 | Im et al. |
| 2008/0208733 A1 | 8/2008 | Robb et al. |
| 2008/0218891 A1 | 9/2008 | Gubbins et al. |
| 2008/0231998 A1 | 9/2008 | Yoshikawa et al. |
| 2008/0268291 A1 | 10/2008 | Akiyama et al. |
| 2008/0304176 A1 | 12/2008 | Takagishi et al. |
| 2009/0052095 A1 | 2/2009 | Yamada et al. |
| 2009/0059417 A1 | 3/2009 | Takeo et al. |
| 2009/0059418 A1 | 3/2009 | Takeo et al. |
| 2009/0059423 A1 | 3/2009 | Yamada et al. |
| 2009/0080105 A1 | 3/2009 | Takashita et al. |
| 2009/0080106 A1 | 3/2009 | Shimizu et al. |
| 2009/0080109 A1* | 3/2009 | Fukuzawa et al. ............ 360/122 |
| 2009/0080120 A1 | 3/2009 | Funayama et al. |
| 2009/0088095 A1 | 4/2009 | Kayano et al. |
| 2009/0097167 A1 | 4/2009 | Sato et al. |
| 2009/0097169 A1 | 4/2009 | Sato et al. |
| 2009/0115541 A1 | 5/2009 | Persson et al. |
| 2009/0225465 A1 | 9/2009 | Iwasaki et al. |
| 2009/0257151 A1 | 10/2009 | Zhang et al. |
| 2009/0262457 A1 | 10/2009 | Rivkin et al. |
| 2009/0316303 A1 | 12/2009 | Yamada et al. |
| 2009/0316304 A1 | 12/2009 | Funayama et al. |
| 2010/0007992 A1 | 1/2010 | Yamada et al. |
| 2010/0007996 A1 | 1/2010 | Iwasaki et al. |
| 2010/0027158 A1 | 2/2010 | Takagishi et al. |
| 2010/0110592 A1 | 5/2010 | Koui et al. |
| 2010/0134922 A1 | 6/2010 | Yamada et al. |
| 2010/0220415 A1 | 9/2010 | Yamada et al. |
| 2011/0038080 A1 | 2/2011 | Alex et al. |
| 2011/0205655 A1 | 8/2011 | Shimizu et al. |
| 2011/0299192 A1 | 12/2011 | Yamada et al. |
| 2011/0300409 A1 | 12/2011 | Yamada et al. |
| 2012/0268844 A1 | 10/2012 | Yamada et al. |
| 2012/0275060 A1 | 11/2012 | Shimizu et al. |

FOREIGN PATENT DOCUMENTS

| | | |
|---|---|---|
| JP | 07-244801 | 9/1995 |
| JP | 2001-243602 | 9/2001 |
| JP | 2002-100005 | 4/2002 |
| JP | 2002-109712 | 4/2002 |
| JP | 2002-208744 | 7/2002 |
| JP | 2002-279616 | 9/2002 |
| JP | 2003-317220 | 11/2003 |
| JP | 2004-192744 | 7/2004 |
| JP | 2004-207707 | 7/2004 |
| JP | 2004-221298 | 8/2004 |
| JP | 2004-234830 | 8/2004 |
| JP | 2004-295987 | 10/2004 |
| JP | 2005-108315 | 4/2005 |

(56) References Cited

FOREIGN PATENT DOCUMENTS

| JP | 2005-525663 | 8/2005 |
| --- | --- | --- |
| JP | 2005-285242 | 10/2005 |
| JP | 2005-310363 | 11/2005 |
| JP | 2006-080385 | 3/2006 |
| JP | 2006-134540 | 5/2006 |
| JP | 2006-147023 | 6/2006 |
| JP | 2006-209960 | 8/2006 |
| JP | 2006-209964 | 8/2006 |
| JP | 2006-244693 | 9/2006 |
| JP | 2006-286855 | 10/2006 |
| JP | 3833512 | 10/2006 |
| JP | 2007-012264 | 1/2007 |
| JP | 2007-035251 | 2/2007 |
| JP | 2007-116003 | 5/2007 |
| JP | 2007-124340 | 5/2007 |
| JP | 2007-184923 | 7/2007 |
| JP | 2007-193906 | 8/2007 |
| JP | 2007-299880 | 11/2007 |
| JP | 2008-109118 | 5/2008 |
| JP | 2008-123669 | 5/2008 |
| JP | 2008-176908 | 7/2008 |
| JP | 2009-070439 | 4/2009 |
| KR | 1020030039289 | 5/2003 |
| WO | 2006-101040 | 9/2006 |

OTHER PUBLICATIONS

Zhu et al., "Microwave Assisted Magnetic Recording (MAMR)," Digest of the 18$^{th}$ Magnetic Recording conference, pp. 34-35, 2007.
Maat et al., "Magnetotransport properties and spin-torque effects in current perpendicular to the plane spin valves with Co—Fe—Al magnetic layers", Journal of Applied Physics 101, 093905 (2007); May 9, 2007.
Park et al., "Effect of Adjacent Layers on Crystallization and Magnetoresistance in CoFeB/MgO/CoFeB Magnetic Tunnel Junction", IEEE Transactions of Magnetics, vol. 42, No. 10, Oct. 2006.
Shen et al., "Effect of Film Roughness in MgO-based Magnetic Tunnel Junctions", Applied Physics Letters 88, 182508 (2006).
Tang et al., "Narrow Track Confinement by AC Field Generation Layer in Microwave Assisted Magnetic Recording", IEEE Transactions of Magnetics, vol. 44, Issue 11, pp. 3376-3379 (Nov. 2008).
Office Action dated Mar. 12, 2010 in Chinese Application No. 200810215755.8 and English-language translation.
Office Action dated Nov. 27, 2009 in Korean Application No. 08-88222 and English-language translation.
Akiyama et al., U.S. Appl. No. 12/109,760, filed Apr. 25, 2008.
Yamada et al., U.S. Appl. No. 12/153,490, filed May 20, 2008.
Yamada et al., U.S. Appl. No. 12/155,329, filed Jun. 2, 2008.
Takagishi et al., U.S. Appl. No. 12/155,473, filed Jun. 4, 2008.
Takeo et al., U.S. Appl. No. 12/196,628, filed Aug. 22, 2008.
Takeo et al., U.S. Appl. No. 12/196,841, filed Aug. 22, 2008.
Iwasaki et al., U.S. Appl. No. 12/232,014, filed Sep. 9, 2008.
Takashita et al., U.S. Appl. No. 12/232,391, filed Sep. 16, 2008.
Funayama et al., U.S. Appl. No. 12/232,392, filed Sep. 16, 2008.
Shimizu et al., U.S. Appl. No. 12/232,469, filed Sep. 17, 2008.
Yamada et al., U.S. Appl. No. 12/382,940, filed Mar. 26, 2009.
Iwasaki et al., U.S. Appl. No. 12/457,657, filed Jun. 17, 2009.
Takagishi et al., U.S. Appl. No. 12/461,027, filed Jul. 29, 2009.
Koui et al., U.S. Appl. No. 12/591,055, filed Nov. 5, 2009.
Shimizu et al., U.S. Appl. No. 12/737,691, filed Feb. 7, 2011.
Yamada et al., U.S. Appl. No. 12/780,269, filed May 13, 2010.
Yamada et al., U.S. Appl. No. 13/214,012, filed Aug. 19, 2011.
Yamada et al., U.S. Appl. No. 13/214,033, filed Aug. 19, 2011.
Yamada et al., U.S. Appl. No. 13/541,371, filed Jul. 3, 2012.
Funayama et al., U.S. Appl. No. 12/457,674, filed Jun. 18, 2009.
Takagishi et al., U.S. Appl. No. 13/071,681, filed Mar. 25, 2011.
Office Action dated Dec. 21, 2012 in JP Application No. 2008-305693 and English-language translation thereof.
Takeo et al., U.S. Appl. No. 12/196,841, filed Aug. 22, 2008—now abandoned.
Iwasaki et al., U.S. Appl. No. 12/232,014, filed Sep. 9, 2008—now abandoned.
Shimizu et al., U.S. Appl. No. 12/232,469, filed Sep. 17, 2008—now abandoned.
Yamada et al., U.S. Appl. No. 12/382,940, filed Mar. 26, 2009—RCE filed May 7, 2012.
Takagishi et al., U.S. Appl. No. 12/461,027, filed Jul. 29, 2009—final office action mailed Jun. 21, 2013.
Yamada et al., U.S. Appl. No. 12/591,752, filed Nov. 30, 2009—RCE filed Aug. 6, 2013.
Takagishi et al., U.S. Appl. No. 13/071,681, filed Mar. 25, 2011—now abandoned.
Yamada et al., U.S. Appl. No. 13/541,371, filed Jul. 3, 2012—allowed.
Shimizu et al., U.S. Appl. No. 13/545,601, Jul. 10, 2012—response to office action filed Aug. 2, 2013.

\* cited by examiner

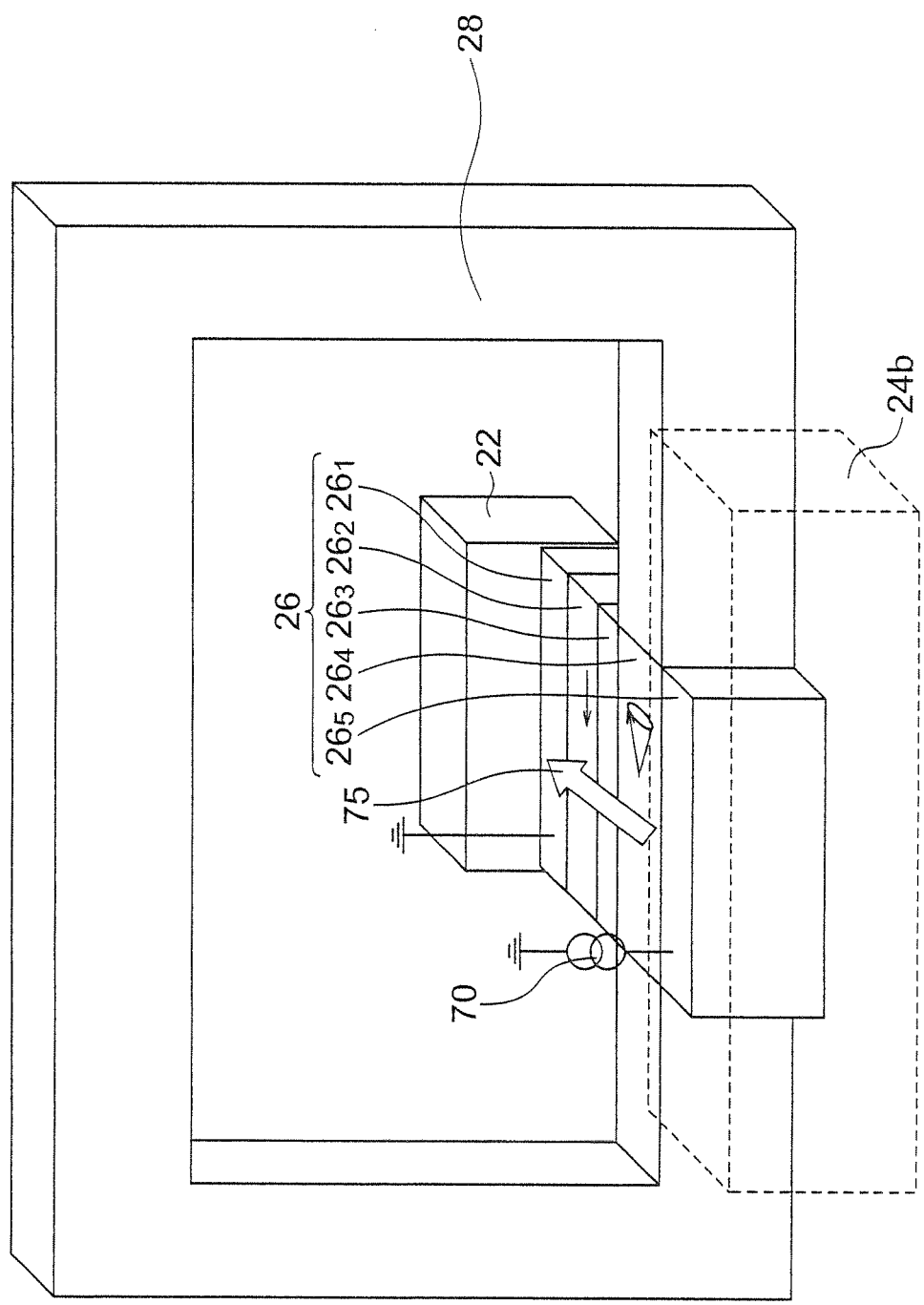

MAGNETIC HEAD WITH SPIN TORQUE OSCILLATOR AND MAGNETIC RECORDING HEAD

CROSS-REFERENCE TO RELATED APPLICATION

This application is a divisional of application Ser. No. 12/232,469, filed Sep. 17, 2008, which is based upon and claims the benefit of priority from prior Japanese Patent Application No. 2007-247966 filed on Sep. 25, 2007 in Japan. The entire contents of each of these applications are incorporated herein by reference.

BACKGROUND AND SUMMARY

1. Field of the Invention

The present invention relates to a magnetic head having a spin torque oscillator, and a magnetic recording device.

2. Related Art

In the 1990's, the recording density and capacity of HDDs (Hard Disk Drives) dramatically increased, with MR (Magneto-Resistive effect) heads and GMR (Giant Magneto-Resistive effect) heads being put into practical use. However, the problems of heat fluctuations of magnetic recording media became apparent in the early 2000's, and the increase of the recording density temporarily slowed down. In 2005, perpendicular magnetic recording, which is more suitable for high-density recording than in-plane magnetic recording in principle, was put into practical use. Since then, the recording density of HDDs has been increasing at an annual rate of approximately 40%.

The latest examinations on recording density show that the recording density of 400 Gbits/inch$^2$ has been reached. If the growth continues at this rate, the recording density of 1 Tbits/inch$^2$ will be achieved around the year 2012. However, achieving such a high recording density is not easy by the perpendicular magnetic recording method by itself, as the problem of heat fluctuations has resurfaced.

To counter this problem, a "high-frequency assisted magnetic recording method" has been suggested. By the high-frequency assisted magnetic recording method, a high-frequency magnetic field at a frequency in the neighborhood of the resonant frequency of a magnetic recording medium, which is much higher than the recording signal frequency, is locally applied to the magnetic recording medium. As a result, the magnetic recording medium where the high-frequency magnetic field applied resonates, and its coercivity (Hc) decreases to half the original value. Having a high-frequency magnetic field been overlapped with the recording magnetic field, magnetic recording on a magnetic recording medium having higher coercivity (Hc) and greater magnetic anisotropic energy (Ku) can be feasible (see U.S. Pat. No. 6,011,664, for example). However, according to U.S. Pat. No. 6,011,664, a high-frequency magnetic field is generated with a coil. By this method, the intensity of the high-frequency magnetic field that can be applied to the recording area rapidly decreases, as the recording area on the magnetic recording medium is made smaller so as to increase the recording density. Therefore, it is difficult to reduce the coercivity of the recording area.

To counter this problem, a method of utilizing spin torque oscillators has been suggested (see United States Patent Application Publication Nos. 2005/0023938 and 2005/0219771, for example). According to United States Patent Application Publication Nos. 2005/0023938 and 2005/0219771, spin torque oscillators are formed with a stacked film consisting of a spin polarization layer, a nonmagnetic layer provided on the spin polarization layer, and a spin oscillation layer provided on the nonmagnetic layer. When a direct current is applied to the spin torque oscillators, the electron spins passing through the spin polarization layer are polarized. The polarized spin current applies a spin torque to the spin oscillation layer, so that the magnetization of the spin oscillation layer has ferromagnetic resonance. As a result, a high-frequency magnetic field is generated from the spin oscillation layer.

This phenomenon can be often observed if the device size is several tens of nanometers or less. Therefore, the region where the high-frequency magnetic field generated from the spin torque oscillators is applied is limited to a very small area at a distance of several tens of nanometers from the spin torque oscillators. A magnetic recording head with the spin torque oscillators, whose oscillation frequency is set at a value equal to or in the neighborhood of the ferromagnetic resonant frequency of the recording layer of the magnetic recording medium, should be provided near the recording magnetic pole and the magnetic recording medium. With this arrangement, the high-frequency magnetic field generated from the spin torque oscillators can be applied only to the very small recording area on the recording layer of the magnetic recording medium. As a result, only the coercivity of the very small recording area can be reduced.

When the coercivity is reduced, the magnetization of the recording area can be reversed or information writing can be performed by applying a recording magnetic field to the recording area with the use of the recording magnetic pole.

Meanwhile, there is a method of performing recording on a magnetic recording medium having high coercivity (Hc) with the use of a diagonal recording magnetic field. According to the Stoner-Wohlfarth model, in a case of a magnetic field in a 45-degree direction, magnetic reversal of a magnetic recording medium having high coercivity (Hc) can be achieved with a small recording magnetic field. By the perpendicular magnetic recording method, it is possible to generate a diagonal recording magnetic field from a plane perpendicular to the plane of the recording magnetic pole facing the recording medium. To generate a diagonal magnetic field having a rapid field intensity change, an auxiliary magnetic pole can be effectively provided near the recording magnetic pole. The gap distance between the plane perpendicular to the plane of the recording magnetic pole facing the recording medium and the plane perpendicular to the plane of the auxiliary magnetic pole facing the recording medium is adjusted so that a magnetic field is diagonally generated in the recording medium and a rapid intensity change can be achieved. Accordingly, a high-density recording can be performed with a magnetic recording head having a recording magnetic pole and an auxiliary magnetic pole. In this manner, a magnetic recording medium having higher coercivity (Hc) and greater magnetic anisotropic energy (Ku) can be used.

To effectively reduce the coercivity of the recording area by applying a high-frequency magnetic field generated from the spin torque oscillators, the oscillation frequency of the spin torque oscillators needs to be substantially equal to the ferromagnetic resonant frequency of the magnetic recording medium. The oscillation frequency of the spin torque oscillators increases in proportion to the effective magnetic field $H_{eff}$ applied to the spin oscillation layer. This effective magnetic field $H_{eff}$ is determined by an internal magnetic field (such as the magnetic anisotropy) of the spin oscillation layer and an external magnetic field (such as a recording magnetic field). In a case where the spin torque oscillators are placed near the recording magnetic pole, the magnetic field applied from the recording magnetic pole to the spin torque oscillator has a value as large as several kOe. As a result, the recording magnetic field applied to the spin torque oscillators becomes much greater than the internal magnetic field, and the oscillation frequency of the spin torque oscillators varies with the direction of the write magnetic field.

The present invention has been made in view of these circumstances, and an object thereof is to provide a magnetic head that can restrict the variation of the oscillation frequency of a spin torque oscillator placed in the vicinity of the recording magnetic pole, and a magnetic recording device that has the magnetic head.

A magnetic head according to a first aspect of the present invention includes: a recording magnetic pole to generate a recording magnetic field; a spin torque oscillator formed in the vicinity of the recording magnetic pole; and a magnetic field applying unit configured to apply a magnetic field to the spin torque oscillator, the magnetic field applied to the spin torque oscillator by the magnetic field applying unit being perpendicular to a recording magnetic field generated from the recording magnetic pole.

A magnetic head according to a second aspect of the present invention includes: a recording magnetic pole to generate a recording magnetic field; a spin torque oscillator formed in the vicinity of the recording magnetic pole; and a magnetic field applying unit provided at either end portion of the spin torque oscillator in a direction perpendicular to a direction parallel to a line connecting the recording magnetic pole and the spin torque oscillator in a plane parallel to an air bearing surface, the magnetic field applying unit configured to apply a magnetic field to the spin torque oscillator, the spin torque oscillator including: a first magnetic layer comprising at least one layer of magnetic film; a second magnetic layer comprising at least one layer of magnetic film; an intermediate layer provided between the first magnetic layer and the second magnetic layer; and an electrode comprising a first electrode layer placed on a face of the first magnetic layer on the opposite side from the intermediate layer, and a second electrode layer placed on a face of the second magnetic layer on the opposite side from the intermediate layer, the electrode being capable of applying a current flowing in a direction perpendicular to film planes of the first magnetic layer, the intermediate layer, and the second magnetic layer, the first electrode layer, the first magnetic layer, the intermediate layer, the second magnetic layer, and the second electrode layer being stacked in a direction parallel to a direction connecting the two end portions of the spin torque oscillator.

A magnetic head according to a third aspect of the present invention includes: a recording magnetic pole to generate a recording magnetic field; a spin torque oscillator formed in the vicinity of the recording magnetic pole; and a magnetic field applying unit provided at either end portion of the spin torque oscillator in a direction perpendicular to a direction parallel to a line connecting the recording magnetic pole and the spin torque oscillator in a plane parallel to an air bearing surface, the magnetic field applying unit configured to apply a magnetic field to the spin torque oscillator, the spin torque oscillator including: a first magnetic layer comprising at least one layer of magnetic film; a second magnetic layer comprising at least one layer of magnetic film; an intermediate layer provided between the first magnetic layer and the second magnetic layer; and an electrode comprising a first electrode layer placed on a face of the first magnetic layer on the opposite side from the intermediate layer, and a second electrode layer placed on a face of the second magnetic layer on the opposite side from the intermediate layer, the electrode being capable of applying a current flowing in a direction perpendicular to film planes of the first magnetic layer, the intermediate layer, and the second magnetic layer, the first electrode layer, the first magnetic layer, the intermediate layer, the second magnetic layer, and the second electrode layer being stacked in a direction perpendicular to a direction connecting the two end portions of the spin torque oscillator.

A magnetic recording device according to a fourth aspect of the present invention includes: a magnetic recording medium; and the magnetic head according to any one of first to third aspects, wherein writing on the magnetic recording medium is performed with the use of the magnetic recording head.

BRIEF DESCRIPTION OF THE DRAWINGS

FIG. 6 is a perspective view showing the second specific example of the spin torque oscillator according to the first embodiment;

DETAILED DESCRIPTION OF EXAMPLE EMBODIMENTS

The following is a description of embodiments of the present invention, with reference to the accompanying drawings.

First Embodiment

Figure 1:
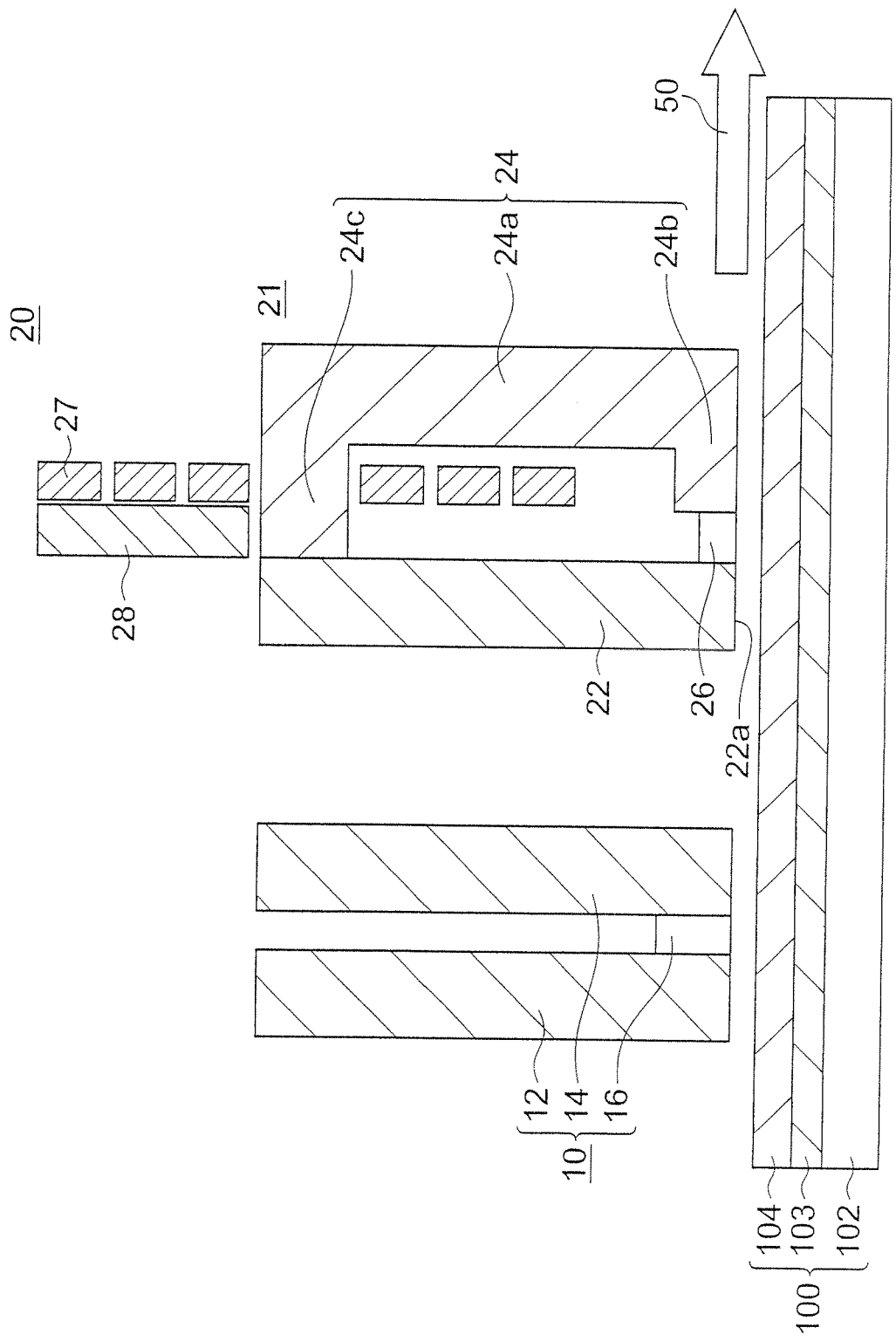
FIG. 1 is a cross-sectional view of a magnetic head according to a first embodiment, taken in the track longitudinal direction.
Figure 2:
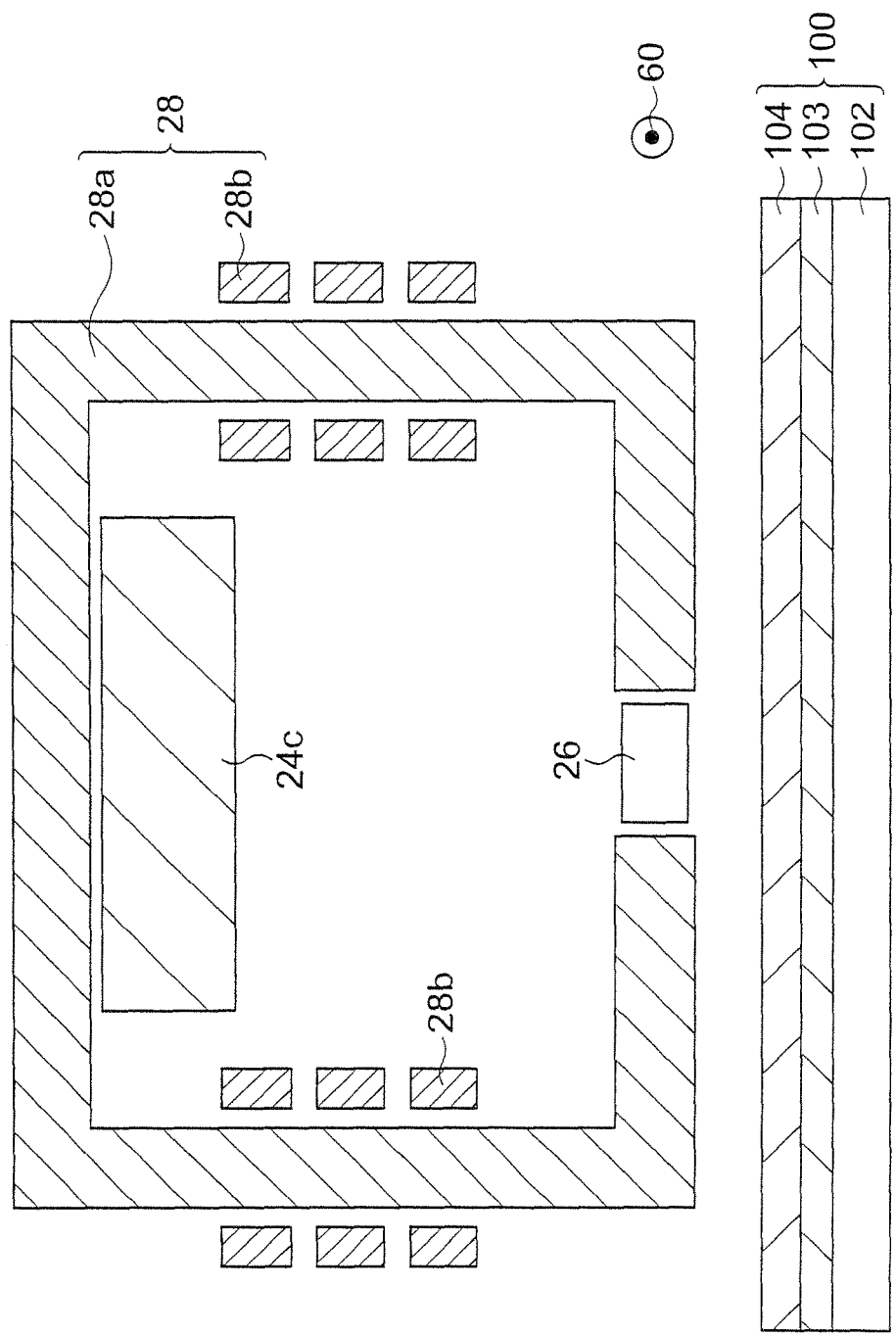
FIG. 2 is a cross-sectional view of the magnetic recording head of the first embodiment, taken in the track width direction.

Referring to FIGS. 1 through 8B, a magnetic head in accordance with a first embodiment of the present invention is described. The magnetic head of this embodiment is a magnetic head for assisting a high-frequency magnetic field, and is used with a perpendicular magnetic recording medium. FIG. 1 is a cross-sectional view of the magnetic head of this embodiment and a magnetic recording medium, taken along a plane in a direction (the track longitudinal direction) that is perpendicular to a plane facing the magnetic recording medium and is parallel to the moving direction of the magnetic recording medium. FIG. 2 is a cross-sectional view of the magnetic head of this embodiment, taken along a plane in a direction (the track width direction) that is perpendicular to the plane facing the magnetic recording medium and is perpendicular to the moving direction of the magnetic recording medium.

As shown in FIG. 1, the magnetic recording head of this embodiment includes a reproducing head unit 10 and a writing head unit 20. The reproducing head unit 10 includes a magnetic shield 12, a magnetic shield 14, and a magnetic reproducing element 16 interposed between the magnetic shield 12 and the magnetic shield 14.

The magnetic reproducing element 16 may be a GMR (Giant Magneto-Resistive effect) element or a TMR (Tunneling Magneto-Resistive effect) element. The magnetic reproducing element 16 is interposed between the end portions of the magnetic shields 12 and 14 on the side of a magnetic recording medium 100.

The magnetic recording medium 100 includes a magnetic recording medium substrate 102, a soft magnetic layer 103 placed on the magnetic recording medium substrate 102, and a magnetic recording layer 104 placed on the soft magnetic layer 103. The magnetic reproducing element 16 is placed in the vicinity of the magnetic recording layer 104 of the magnetic recording medium 100. The magnetic reproducing element 16 and the area of the magnetic recording layer 104 located immediately below the magnetic reproducing element 16 (the read area) form a magnetic circuit. The magnetic resistance of this magnetic circuit varies with the magnetization direction recorded in the read area of the magnetic recording layer 104. The magnetic reproducing element 16 detects the varying magnetic resistance, so as to read (reproduce) the magnetization direction recorded on the magnetic recording layer 104 (recorded information). In FIG. 1, the moving direction of the magnetic recording medium 100 is indicated by the arrow 50.

The writing head unit 20 includes a magnetic core 21 formed with a main magnetic pole (recording magnetic pole) 22 and a return yoke (a magnetic shield) 24, an electromagnetic coil 27 for exciting the magnetic core 21, a spin torque oscillator 26, and an electromagnet 28 for applying a magnetic field to the spin torque oscillator 26. The return yoke 24 includes a main portion 24a, a front portion 24b connected to the end portion of the main portion 24a on the side of the magnetic recording medium 100, and a rear portion 24c connected to the end portion of the main portion 24a on the opposite side from the magnetic recording medium 100. The front portion 24b extends in a direction parallel to an air bearing surface 22a of the recording magnetic pole. The rear portion 24c is also connected to the end portion of the main magnetic pole 22 on the opposite side from the magnetic recording medium 100. The spin torque oscillator 26 is interposed between the end portion of the main magnetic pole 22 on the side of the magnetic recording medium 100 and the front portion 24b of the return yoke 24. The electromagnetic coil 27 is designed to surround or wind around the rear portion 24c of the return yoke 24, so as to excite the magnetic core 21. In this embodiment, the spin torque oscillator 26 is provided on the trailing side of the main magnetic pole 22.

The electromagnet 28 includes a C-shaped magnetic core 28a and electromagnetic coils 28b for exciting the magnetic core 28a (see FIG. 2). The C-shaped magnetic core 28a is placed to substantially be perpendicular to the magnetic core 21, and the spin torque oscillator 26 is placed between the magnetic poles of the magnetic core 28a.

The components of the reproducing head unit are insulated from the components of the writing head unit by an insulator (not shown) such as alumina. In FIG. 2, reference numeral 60 indicates the moving direction of the magnetic recording medium 100, which moves forward in the direction perpendicular to the paper plane.

The magnetization of the magnetic recording layer 104 is controlled in a predetermined direction by the magnetic field applied by the writing head unit 20, and writing is performed. The reproducing head unit 10 reads the magnetization direction of the magnetic recording layer 104.

Figure 3:
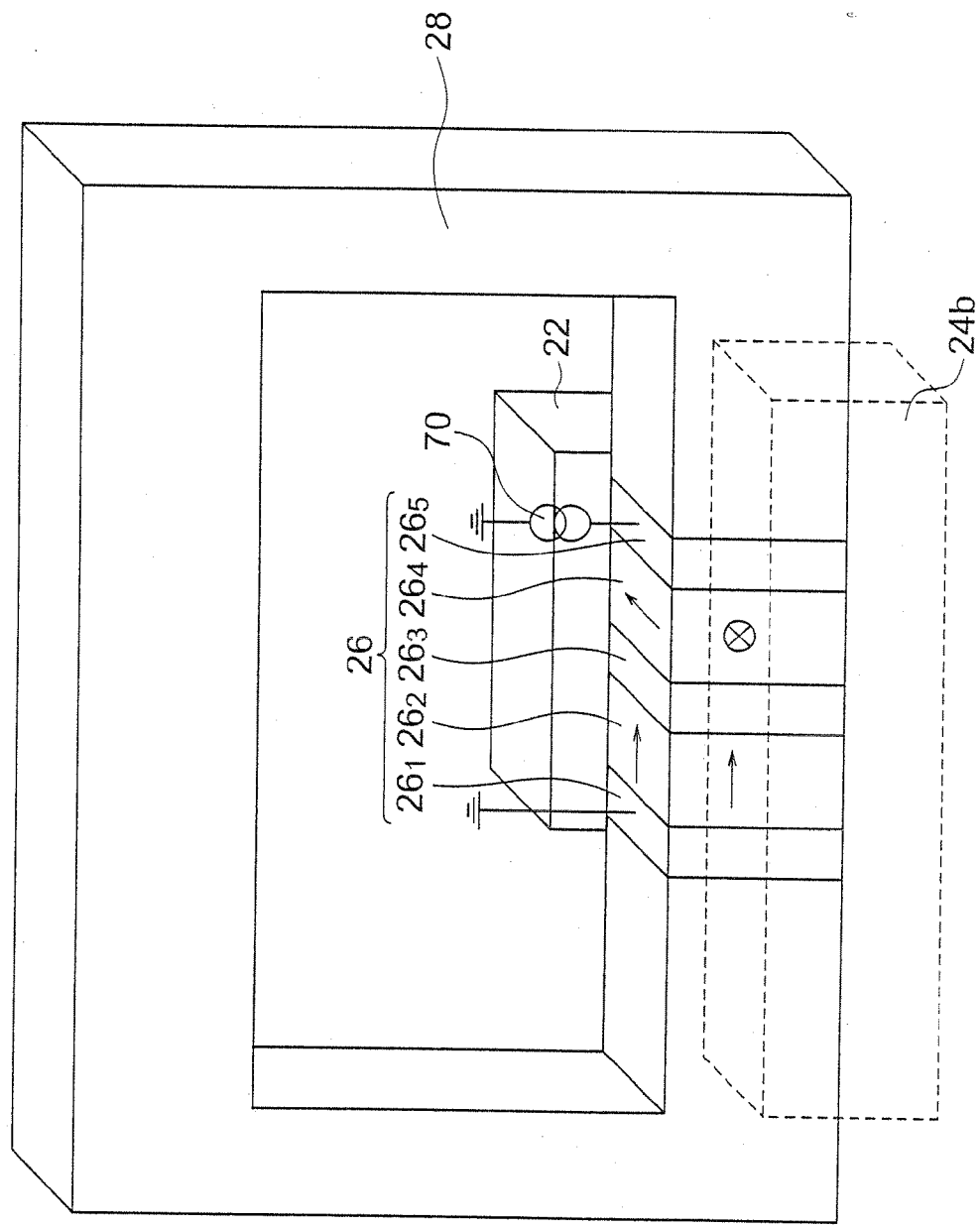
FIG. 3 is a perspective view showing a first specific example of the spin torque oscillator according to the first embodiment.

FIG. 3 illustrates a first specific example of the spin torque oscillator 26 to be used for the magnetic head of this embodiment. The spin torque oscillator 26 of the first specific example has a stacked structure. In the stacked structure, an electrode layer $26_1$, a spin injection layer $26_2$ (a second magnetic layer) having a fixed magnetization direction, an intermediate layer $26_3$ having a high spin transmission rate, an oscillation layer $26_4$ (a first magnetic layer), and an electrode layer $26_5$ are stacked. The film plane of this stacked structure is substantially perpendicular to the air bearing surface of the stacked structure facing the magnetic recording medium 100, and is substantially parallel to the moving direction 50 of the magnetic recording medium 100. In other words, the film plane of this stacked structure is substantially parallel to the direction extending from the main magnetic pole 22 to the front portion 24b of the return yoke 24. In this first specific example, the film plane of the stacked structure of the spin torque oscillator 26 is substantially perpendicular to the orientation of the magnetic field that is applied to the spin torque oscillator 26 by the electromagnet 28.

Figure 4:
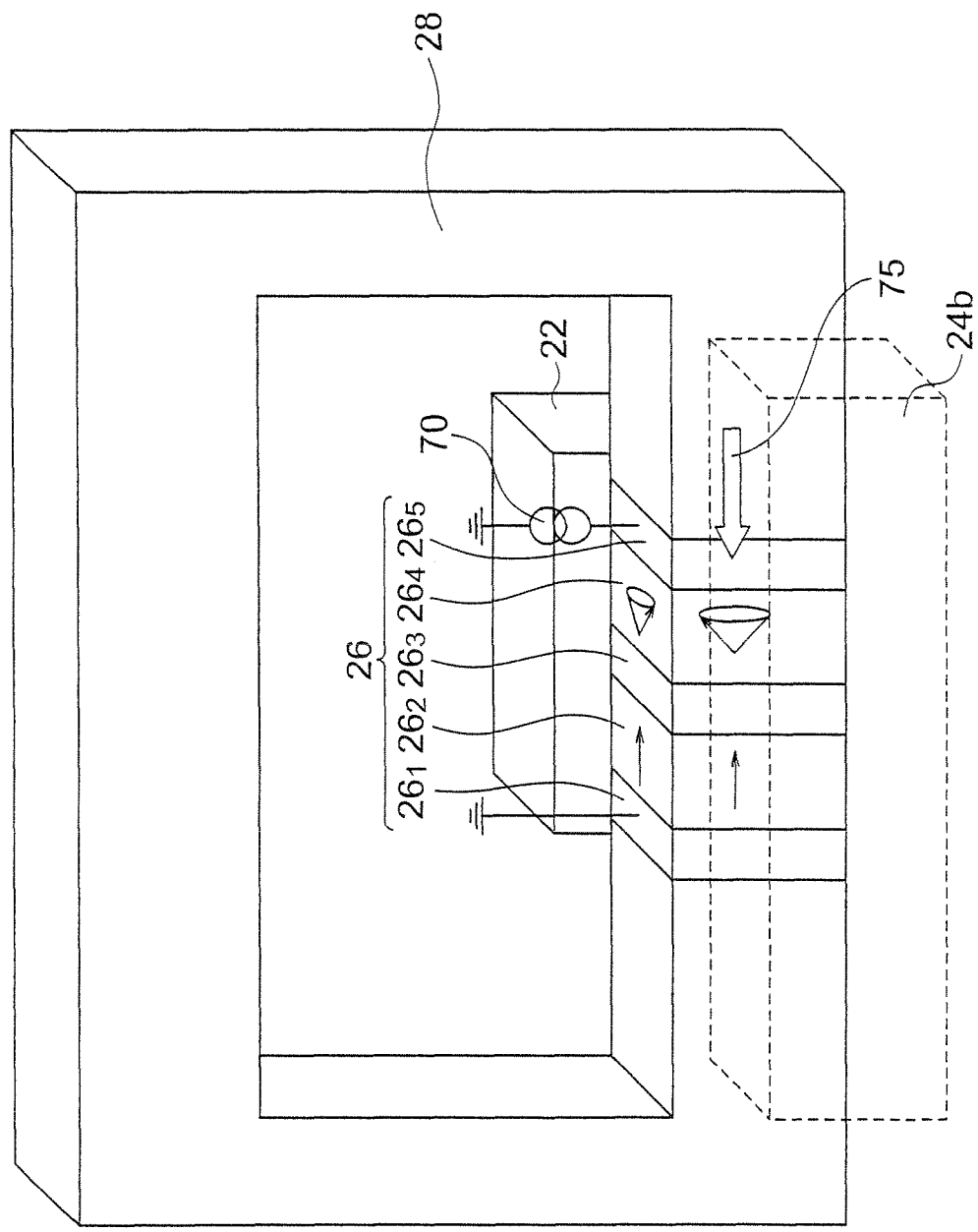
FIG. 4 is a perspective view showing the first specific example of the spin torque oscillator according to the first embodiment.

With the use of a constant current source 70 that is suitably placed inside or outside the magnetic head, a predetermined direct current can be applied to the spin torque oscillator 26 via the electrode layer $26_1$ and the electrode layer $26_5$, as shown in FIG. 4. In FIG. 4, the current flows from the electrode layer $26_5$ to the electrode layer $26_1$, as indicated by the arrow 75, or the current flows in a direction perpendicular to the film plane of the stacked structure of the spin torque oscillator 26.

FIG. 3 shows the magnetization directions of the spin injection layer $26_2$ and the oscillation layer $26_4$ that are observed when there is not an external magnetic field, and the current from the constant current source 70 does not flow into the spin torque oscillator 26. The magnetization of the spin injection layer $26_2$ is oriented in a direction perpendicular to the film plane, and the magnetization of the oscillation layer $26_4$ is oriented in a direction parallel to the film plane. When the current generated from the constant current source 70 is applied to the spin torque oscillator 26 in this situation, a spin torque is applied to the magnetization of the oscillation layer $26_4$ as described later, and the magnetization of the oscillation layer $26_4$ exhibits ferromagnetic resonance (magnetization precession), as shown in FIG. 4.

Figure 5:
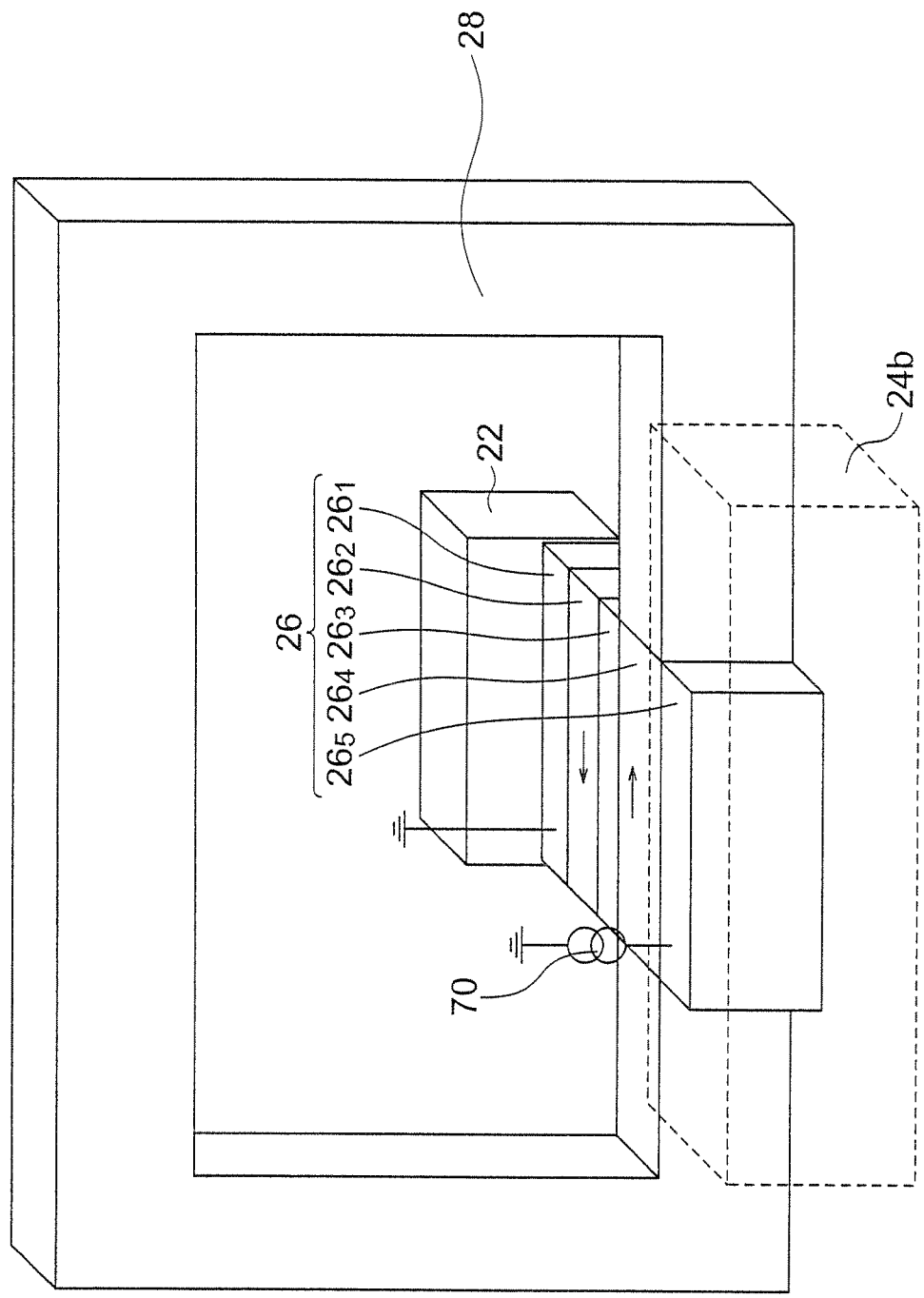
FIG. 5 is a perspective view showing a second specific example of the spin torque oscillator according to the first embodiment.

As in a second specific example shown in FIG. 5, the spin torque oscillator 26 may have a stacked structure in which an electrode layer $26_1$, a spin injection layer $26_2$, an intermediate layer $26_3$ having a high spin transmission rate, an oscillation layer $26_4$, and an electrode layer $26_5$ are stacked, and the film plane of this stacked structure is substantially perpendicular to the air bearing surface of the stacked structure and is substantially perpendicular to the moving direction 50 of the magnetic recording medium 100. In this case, the film plane of this stacked structure is substantially perpendicular to the direction extending from the main magnetic pole 22 to the front portion 24b of the return yoke 24. In this second specific example, the film plane of the stacked structure of the spin torque oscillator 26 is substantially parallel to the orientation of the magnetic field that is applied to the spin torque oscillator 26 by the electromagnet 28.

FIG. 5 shows the magnetization directions of the spin injection layer $26_2$ and the oscillation layer $26_4$ that are observed when there is not an external magnetic field, and the current from the constant current source 70 does not flow into the spin torque oscillator 26. The magnetization directions of the spin injection layer $26_2$ and the oscillation layer $26_4$ are substantially parallel to the film plane, and are antiparallel to each other (the opposite direction from each other). When the current generated from the constant current source 70 is applied in the direction indicated by the arrow 75 in FIG. 6 to the spin torque oscillator 26 in this situation, a spin torque is applied to the magnetization of the oscillation layer $26_4$ as described later, and the magnetization of the oscillation layer $26_4$ exhibits ferromagnetic resonance (magnetization precession), as shown in FIG. 6. In a case where the magnetic directions of the spin injection layer $26_2$ and the oscillation layer $26_4$ are parallel to the film plane and are parallel to each other (the same directions) when there is not an external magnetic field and the current from the constant current source 70 does not flow into the spin torque oscillator 26, a spin torque can be applied to the magnetization of the oscillation layer $26_4$ by applying the current in the opposite direction from the arrow 75 shown in FIG. 6, and the magnetization of the oscillation layer $26_4$ exhibits ferromagnetic resonance (magnetization precession).

As can be seen from FIGS. 3 through 6, the bias magnetic field $H_{bias}$ applied to the spin torque oscillator 26 by the electromagnet 28 is substantially perpendicular to the direction extending from the main magnetic pole 22 to the front portion 24b of the return yoke 24. In FIGS. 3 through 6, the main magnetic pole 22 and the front portion 24b of the return yoke 24 are only schematically shown for convenience sake.

Next, the principles of the ferromagnetic resonance of the magnetization of the oscillation layer $26_4$ are described. When a current is applied to the electrode layer $26_5$, the oscillation layer $26_4$, the intermediate layer $26_3$, the spin injection layer $26_2$, and the electrode layer $26_1$ in this order, electrons flow in the opposite direction from the current flowing direction. In this case, the electron spins flowing from the electrode layer $26_1$ into the spin injection layer $26_2$ and passing through the spin injection layer $26_2$ are polarized in a direction parallel to the magnetization direction of the spin injection layer $26_2$. The polarized electrons then flow into the oscillation layer $26_4$ via the intermediate layer $26_3$ having a high spin transmission rate, and cause a spin torque in the magnetization of the oscillation layer $26_4$.

In a case where the current is applied in the opposite direction from the above, electrons having spins in the opposite direction from the magnetization direction of the spin injection layer $26_2$ are reflected by the interface between the intermediate layer $26_3$ and the spin injection layer $26_2$. The reflected electrons are injected into the oscillation layer $26_4$ through the intermediate layer $26_3$, and cause a spin torque in the magnetization of the oscillation layer $26_4$. As a result, the magnetization of the oscillation layer $26_4$ exhibits ferromagnetic resonance (magnetization precession), and a high-frequency magnetic field is generated in accordance with the magnetic characteristics of the oscillation layer $26_4$ and the intensity of the magnetic field applied by the electromagnet 28.

As shown in FIGS. 1 and 2, the spin torque oscillator 26 is placed between the main magnetic pole 22 and the return yoke 24, and between the magnetic poles of the electromagnet 28 that applies a magnetic field. The bias magnetic field $H_{bias}$ applied by the electromagnet 28 that is provided to generate a magnetic field is applied to the oscillation layer $26_4$ of the spin torque oscillator 26. Since the oscillation frequency of the spin torque oscillator 26 is substantially determined by the intensity of the applied magnetic field, the oscillation frequency can be controlled by the electromagnet 28 applying the bias magnetic field $H_{bias}$. The electromagnet 28 is made of a material such as FeCo, which has a relatively high saturation flux density.

The electrode layer $26_1$ and the electrode layer $26_5$ of the spin torque oscillator 26 are preferably made of a material such as Ti or Cu, which has a low electric resistance and is not easily oxidized. The intermediate layer $26_3$ is made of a material having a high spin transmission rate, such as Cu, Ag, or Au. Examples of the materials for the spin injection layer $26_2$ and the oscillation layer $26_4$ include:

(1) soft magnetic layers each having a relatively high saturation flux density and magnetic anisotropy in the film in-plane direction, such as a CoFe layer, a CoNiFe layer, a NiFe layer, a CoZrNb layer, a FeN layer, a FeSi layer, and a FeAlSi layer (suitable for the oscillation layer);

(2) CoCr magnetic alloy films each having magnetization oriented in the film in-plane direction;

(3) CoCr magnetic layers each having magnetization oriented in a direction perpendicular to the film plane, such as a CoCrPt layer, a CoCrTa layer, a CoCrTaPt layer, and a CoCrTaNb layer (suitable for the spin injection layer);

(4) RE-TM amorphous alloy magnetic layers, such as a TbFeCo layer (suitable for the spin injection layer);

(5) Co artificial lattice magnetic layers, such as a Co/Pd layer, a Co/Pt layer, and a CoCrTa/Pd layer (suitable for the spin injection layer);
(6) materials with excellent vertical alignment, such as CoPt or FePt alloy magnetic layers and SmCo alloy magnetic layers (suitable for the spin injection layer); and
(7) alloys that are formed by adding Al, Si, Ge, Mn, or Cr to CoFe (suitable for the spin injection layer).

Alternatively, to adjust the saturation flux density and the anisotropic magnetic field, the above materials may be stacked to form the spin injection layer and the oscillation layer. Also, to increase the oscillation frequency of the oscillation layer, or to effectively secure the magnetization of the spin injection layer, the above materials may be stacked, with a nonmagnetic layer being interposed in between, so as to form the spin injection layer $26_2$ or the oscillation layer $26_4$. The resultant stacked structure may be a stacked ferri-structure in which the magnetization directions of the above materials are antiparallel to one another, or a stacked structure in which the magnetization directions of the above materials are parallel to one another. In such a case, it is preferable that a noble metal such as Cu, Pt, Au, Ag, Pd, or Ru is used for the nonmagnetic layer, and it is possible to use a nonmagnetic transition metal such as Cr, Rh, Mo, or W.

Further, a stacked structure of a ferromagnetic layer and an antiferromagnetic layer that takes advantage of exchange coupling may be used for the spin injection layer $26_2$ or the oscillation layer $26_4$. This is because the magnetization of the spin injection layer can be effectively secured as the oscillation frequency of the oscillation layer is increased. Here, examples of the material for the antiferromagnetic layer include FeMn, NiMn, FeNiMn, FeMnRh, RhMn, CoMn, CrMn, CrMnPt, CrMnRh, CrMnCu, CrMnPd, CrMnIr, CrMnNi, CrMnCo, CrMnTi, PtMn, PdMn, PdPtMn, and IrMn.

The thickness of the oscillation layer $26_4$ is preferably 5 nm or greater so as to apply a sufficient high-frequency magnetic field to the magnetic recording medium 100, and is preferably 20 nm or smaller so as to achieve a uniform oscillation mode. The thickness of the spin injection layer $26_2$ is preferably 2 nm or greater, so as to restrict the oscillation at the spin injection layer $26_2$.

Figure 7A:
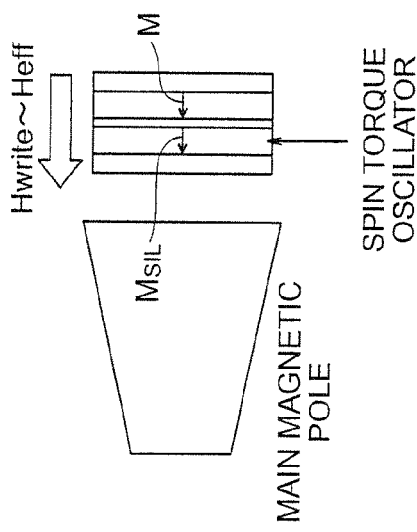
FIGS. 7A to 7D illustrate the relationship between the leakage magnetic field from the main magnetic pole and the effective magnetic field applied to the oscillator layer.
Figure 7B:
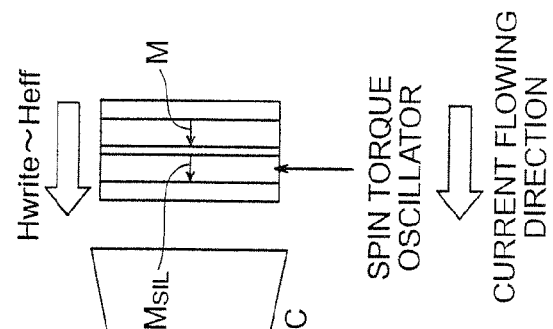
Figure 7C:
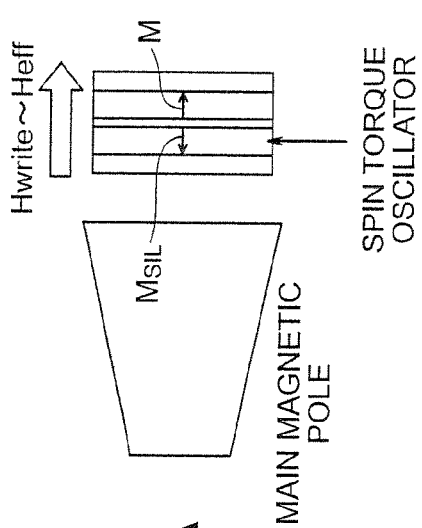
Figure 7D:
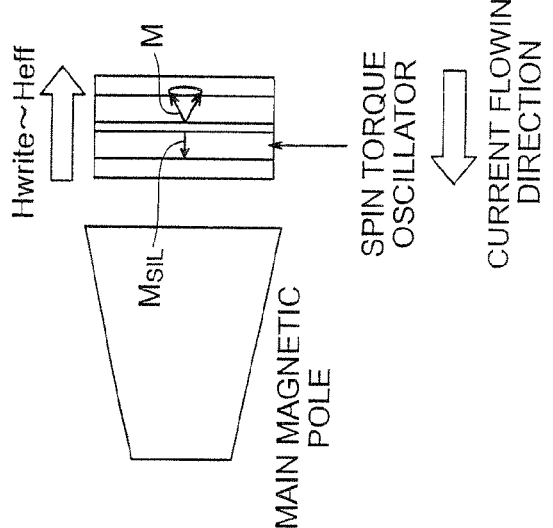

The effects of this embodiment are now described. FIGS. 7A to 7D illustrate the relationship between the leakage field from the main magnetic pole of a conventional magnetic head and the magnetization direction of the spin injection layer of the spin torque oscillator in each of the magnetic heads that are disclosed in United States Patent Application Publication Nos. 2005/0023938 and 2005/0219771. To form a magnetic recording head that efficiently assists a high-frequency magnetic field, the spin torque oscillator should be placed close to the main magnetic pole, and the in-plane high-frequency magnetic field and the diagonal recording magnetic field should be efficiently combined with each other in a magnetic recording medium. As the spin torque oscillator is placed in the vicinity of the main magnetic pole, the write magnetic field applied to the oscillator layer of the spin torque oscillator by the main magnetic pole reaches several kOe. Therefore, each of the conventional structures disclosed in United States Patent Application Publication Nos. 2005/0023938 and 2005/0219771 has the problem that the oscillation conditions vary with the orientation of the write magnetic field. As shown in FIGS. 7A and 7B, the effective magnetic field $H_{\mathit{eff}}$ of the oscillation layer is substantially determined by the write magnetic field $H_{\mathit{write}}$, and becomes substantially antiparallel (FIG. 7A) or parallel (FIG. 7B) to the magnetization direction $M_{\mathit{SIL}}$ of the spin injection layer, depending on the positive or negative orientation of the write magnetic field $H_{\mathit{write}}$. In a case where a current flows in the direction shown in FIGS. 7C and 7D, when the effective magnetic field $H_{\mathit{eff}}$ is substantially antiparallel to the magnetization direction $M_{\mathit{SIL}}$ of the spin injection layer (FIG. 7C), a spin torque is applied to the oscillation layer, and a high-frequency magnetic field in accordance with the magnetic characteristics and effective magnetic field and the likes of the oscillator layer is generated. When the effective magnetic field $H_{\mathit{eff}}$ is substantially parallel to the magnetization direction $M_{\mathit{SIL}}$ of the spin injection layer (FIG. 7D), a spin torque is not applied to the oscillation layer, and the magnetization of the oscillation layer does not oscillate. In FIGS. 7A to 7D, the symbol M indicates the magnetization direction of the oscillation layer.

Figure 8B:
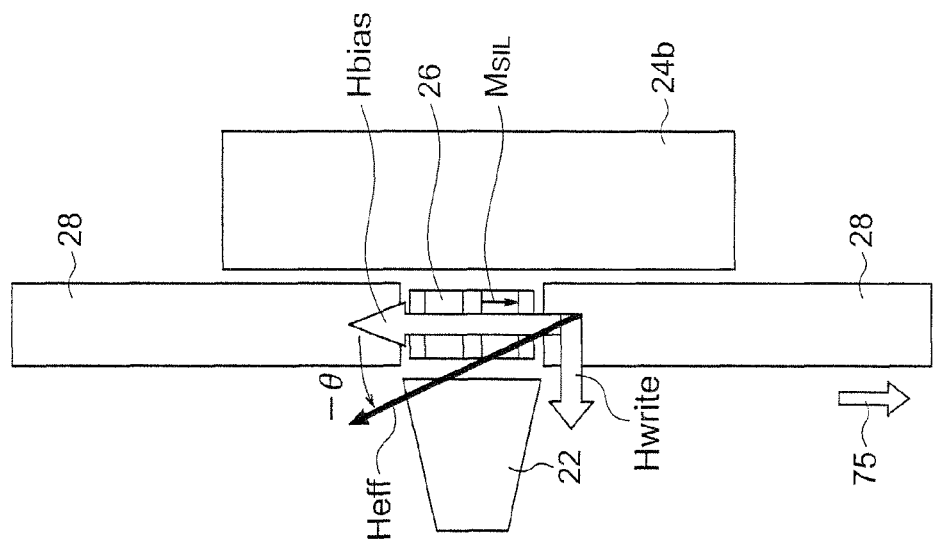
FIGS. 8A and 8B illustrate the effects of the first embodiment.
Figure 8A:
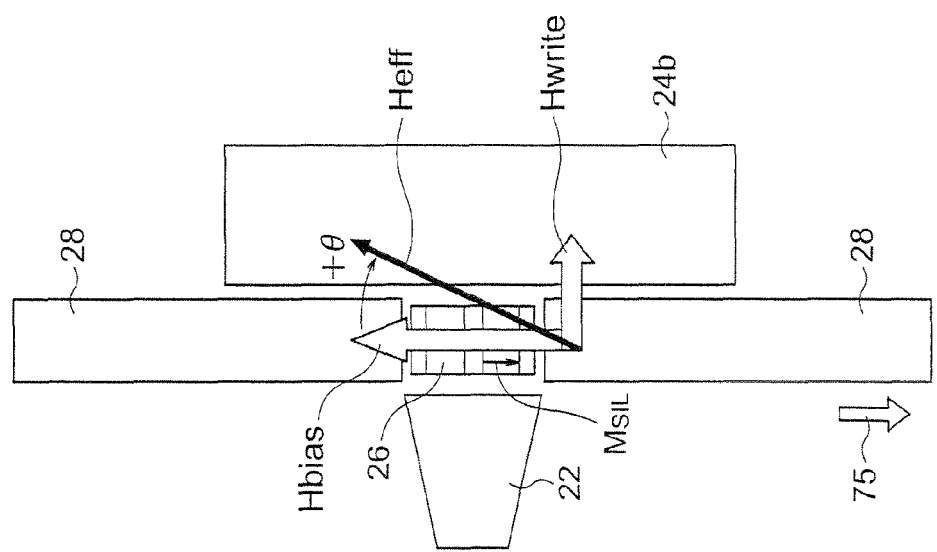

In this embodiment, on the other hand, the direction of the bias magnetic field $H_{\mathit{bias}}$ is substantially perpendicular to the direction of the write magnetic field $H_{\mathit{write}}$, as shown in FIGS. 8A and 8B. Accordingly, the effective magnetic field $H_{\mathit{eff}}$ of the oscillator layer of the spin torque oscillator 26 (the rotational axis of the magnetization of the oscillator layer) is tilted from the direction of the bias magnetic field $H_{\mathit{bias}}$ of the spin torque oscillator 26 by a predetermined angle $\pm\theta$, depending on the write magnetic field $H_{\mathit{write}}$ of the main magnetic pole 22. However, it is considered that the effective magnetic field $H_{\mathit{eff}}$ determining the oscillator frequency has an invariable component in the direction of the bias magnetic field $H_{\mathit{bias}}$. Accordingly, the oscillator frequency can be made stable even when the direction of the write magnetic field $H_{\mathit{write}}$ varies. In FIGS. 8A and 8B, the magnetization direction $M_{\mathit{SIL}}$ of the spin injection layer is substantially antiparallel to the direction of the bias magnetic field $H_{\mathit{bias}}$, and the angle $\theta$ is small enough. Accordingly, the effective magnetic field $H_{\mathit{eff}}$ is substantially antiparallel to the magnetization direction $M_{\mathit{SIL}}$ of the spin injection layer, and stable oscillation can be maintained when a current flows in the direction of the arrow 75 shown in FIGS. 8A and 8B. FIGS. 8A and 8B are plan views of the writing head unit, seen from the magnetic recording medium side. In this embodiment, each specific example of the spin torque oscillator has the electrode layer $26_5$, the oscillator layer $26_4$, the intermediate layer $26_3$, the spin injection layer $26_2$, and the electrode layer $26_1$ stacked in a direction substantially parallel to the magnetic field applied to the spin torque oscillator 26. However, the electrode layer $26_5$, the oscillator layer $26_4$, the intermediate layer $26_3$, the spin injection layer $26_2$, and the electrode layer $26_1$ may be stacked in a direction substantially perpendicular to the direction of the magnetic field applied to the spin torque oscillator 26. With such a spin torque oscillator, a variation of the spin torque oscillator frequency due to a recording magnetic field can also be restricted.

Next, modifications of the magnetic head of this embodiment are described.

First Modification

Figure 9:
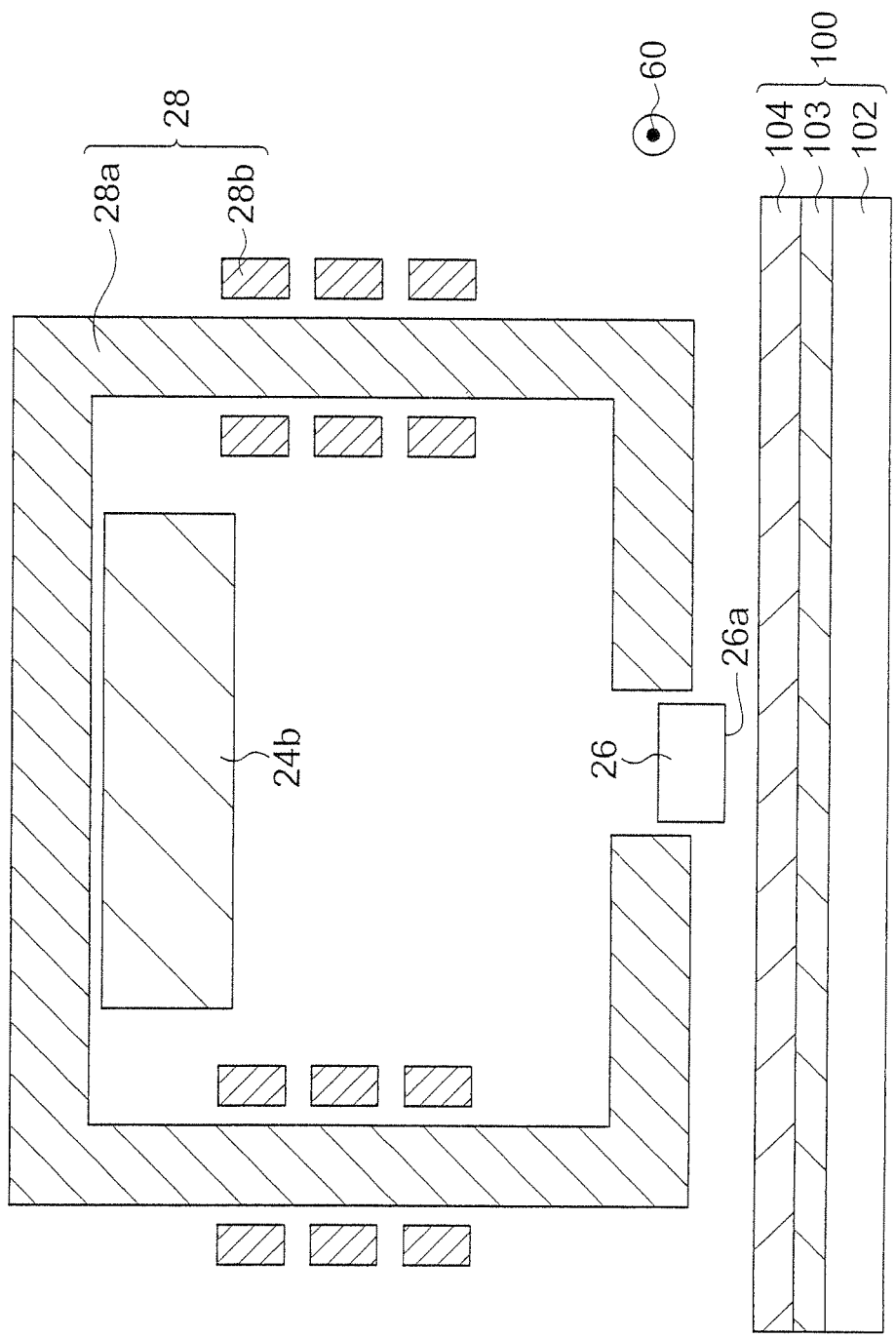
FIG. 9 is a cross-sectional view of a magnetic head according to a first modification of the first embodiment, taken in the track width direction.

FIG. 9 illustrates a magnetic head in accordance with a first modification of this embodiment. FIG. 9 is a cross-sectional view of the magnetic head of this modification, taken along a plane in a direction (the track width direction) perpendicular to the surface of the magnetic recording medium and the moving direction of the magnetic recording medium. This modification differs from the first embodiment illustrated in FIG. 2, in that the magnetic core of the electromagnet 28 is placed several nanometers to 10 nm further away from the air bearing surface 26a of the spin torque oscillator 26, so that the magnetic core is also further away from the magnetic recording medium 100. With this arrangement, the intensity of the leakage magnetic field applied to the magnetic recording medium 100 by the magnetic core 28a of the electromagnet 28 becomes lower, and magnetization information can be stably recorded in the recording unit.

Like the first embodiment, this modification can restrict the variation of the spin torque oscillator frequency due to a recording magnetic field.

In this modification, as the spin torque oscillator 26, it is possible to employ a spin torque oscillator having the electrode layer $26_5$, the oscillator layer $26_4$, the intermediate layer $26_3$, the spin injection layer $26_2$, and the electrode layer $26_1$ stacked in a direction substantially parallel to the direction of the magnetic field applied to the spin torque oscillator 26 by the electromagnet 28, as shown in FIG. 4. It is also possible to employ a spin torque oscillator having the electrode layer $26_5$, the oscillator layer $26_4$, the intermediate layer $26_3$, the spin injection layer $26_2$, and the electrode layer $26_1$ stacked in a direction substantially perpendicular to the orientation of the magnetic field applied to the spin torque oscillator 26 by the electromagnet 28, as shown in FIG. 6.

Second Modification

Figure 10:
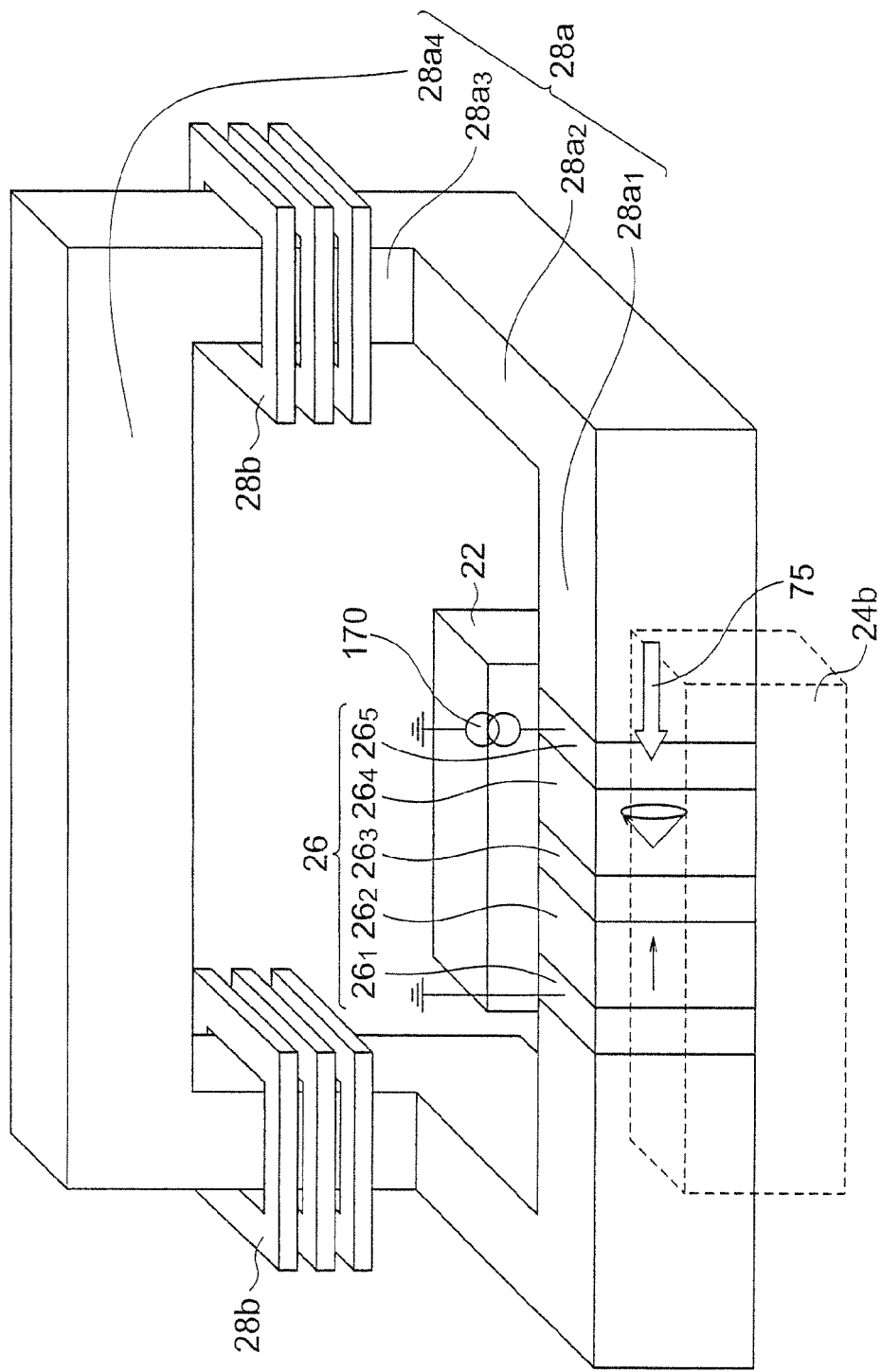
FIG. 10 is a perspective view of a magnetic head according to a second modification of the first embodiment.

FIG. 10 illustrates a magnetic head in accordance with a second modification of the first embodiment. FIG. 10 is a schematic perspective view of the magnetic head of this modification. In the first embodiment illustrated in FIG. 4 or 6, the magnetic core 28a of the electromagnet 28 is designed to surround the rear portion 24c of the return yoke 24. In this modification, however, the magnetic core 28a of the electromagnet 28 is designed to surround the main magnetic pole 22. This magnetic core 28a includes a pair of first portions $28a_1$, a pair of second portions $28a_2$, a pair of third portions $28a_3$, and a pair of fourth portions $28a_4$. The pair of first portions $28a_1$ has magnetic poles magnetically connected to the spin torque oscillator 26, and extend in a direction parallel to the air bearing surface of the spin torque oscillator and perpendicular to the direction from the front portion 24b of the return yoke 24 to the main magnetic pole 22. Each of the second portions $28a_2$ has one end connected to the corresponding first portion $28a_1$, and extends in a direction parallel to the air bearing surface of the spin torque oscillator and also parallel to the direction from the front portion 24b of the return yoke 24 to the main magnetic pole 22. Each of the third portions $28a_3$ has one end connected to the other end of the corresponding second portion $28a_2$, and extends in a direction perpendicular to the air bearing surface of the spin torque oscillator. The pair of fourth portions $28a_4$ are connected to the other ends of the third portions $28a_3$, and extend in a direction parallel to the air bearing surface of the spin torque oscillator and perpendicular to the direction from the front portion 24b of the return yoke 24 to the main magnetic pole 22.

The first through fourth portions are designed to surround the main magnetic pole 22. Accordingly, the fourth portions $28a_4$ are interposed between the main magnetic pole 22 and the reproducing head unit (not shown). Also, a pair of electromagnetic coils 28b are provided to surround the respective third portions $28a_3$.

Like the first embodiment, this modification can restrict the variation of the spin torque oscillator frequency due to a recording magnetic field.

In this modification, as the spin torque oscillator 26, it is possible to employ a spin torque oscillator having the electrode layer $26_5$, the oscillator layer $26_4$, the intermediate layer $26_3$, the spin injection layer $26_2$, and the electrode layer $26_1$ stacked in a direction substantially parallel to the direction of the magnetic field applied to the spin torque oscillator 26 by the electromagnet 28, as shown in FIG. 4. It is also possible to employ a spin torque oscillator having the electrode layer $26_5$, the oscillator layer $26_4$, the intermediate layer $26_3$, the spin injection layer $26_2$, and the electrode layer $26_1$ stacked in a direction substantially perpendicular to the direction of the magnetic field applied to the spin torque oscillator 26 by the electromagnet 28, as shown in FIG. 6.

Third Modification

Figure 11:
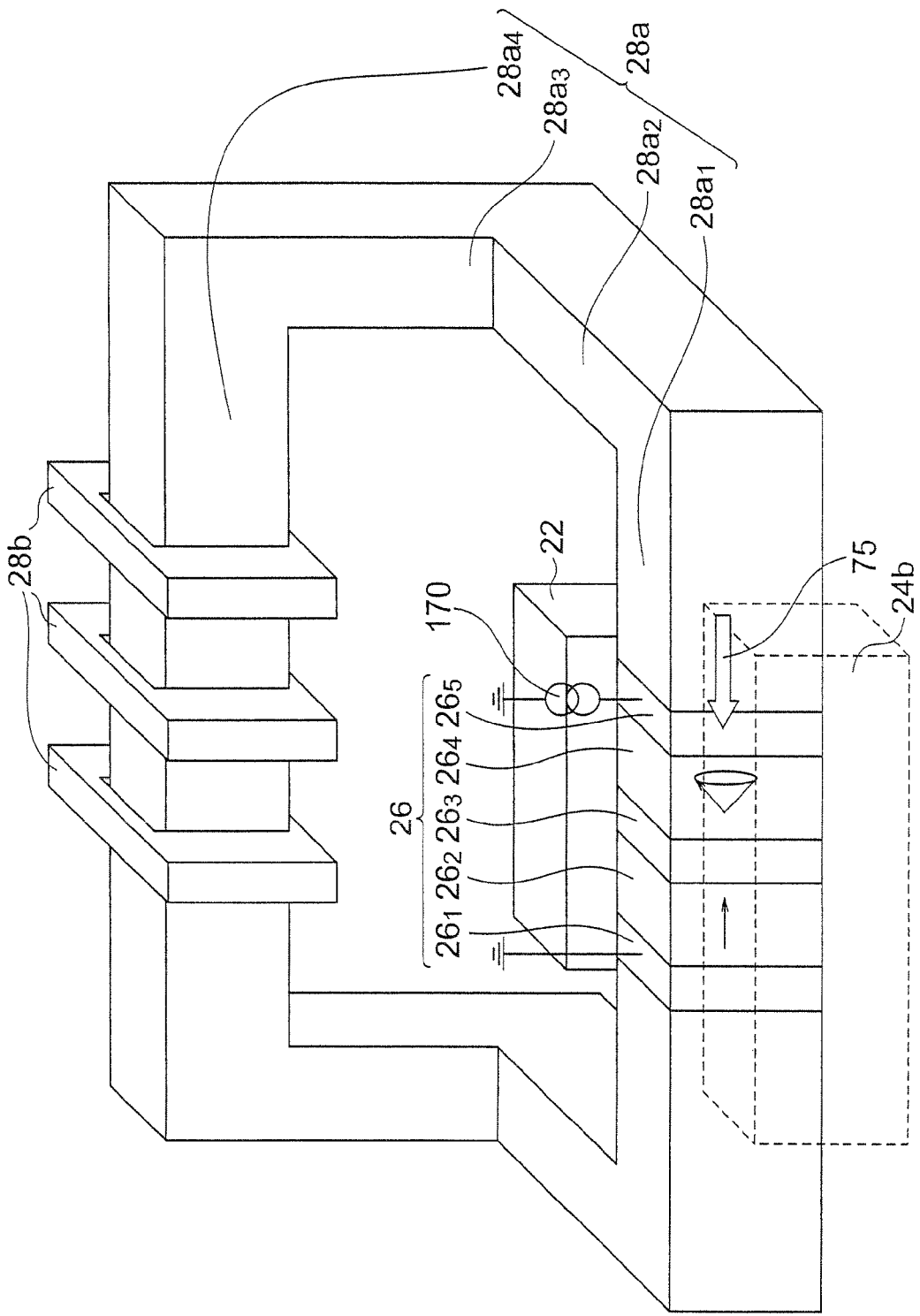
FIG. 11 is a perspective view of a magnetic head according to a third modification of the first embodiment.

FIG. 11 illustrates a magnetic head in accordance with a third modification of the first embodiment. FIG. 11 is a schematic perspective view of the magnetic head of this modification. The magnetic head of this modification differs from the second modification illustrated in FIG. 10, in that the electromagnetic coils 28b are designed to surround the fourth portions $28a_4$.

Like the first embodiment, this modification can also restrict the variation of the spin torque oscillator frequency due to a recording magnetic field.

In this modification, as the spin torque oscillator 26, it is possible to employ a spin torque oscillator having the electrode layer $26_5$, the oscillator layer $26_4$, the intermediate layer $26_3$, the spin injection layer $26_2$, and the electrode layer $26_1$ stacked in a direction substantially parallel to the direction of the magnetic field applied to the spin torque oscillator 26 by the electromagnet 28, as shown in FIG. 4. It is also possible to employ a spin torque oscillator having the electrode layer $26_5$, the oscillator layer $26_4$, the intermediate layer $26_3$, the spin injection layer $26_2$, and the electrode layer $26_1$ stacked in a direction substantially perpendicular to the direction of the magnetic field applied to the spin torque oscillator 26 by the electromagnet 28, as shown in FIG. 6.

Fourth Modification

Figure 12:
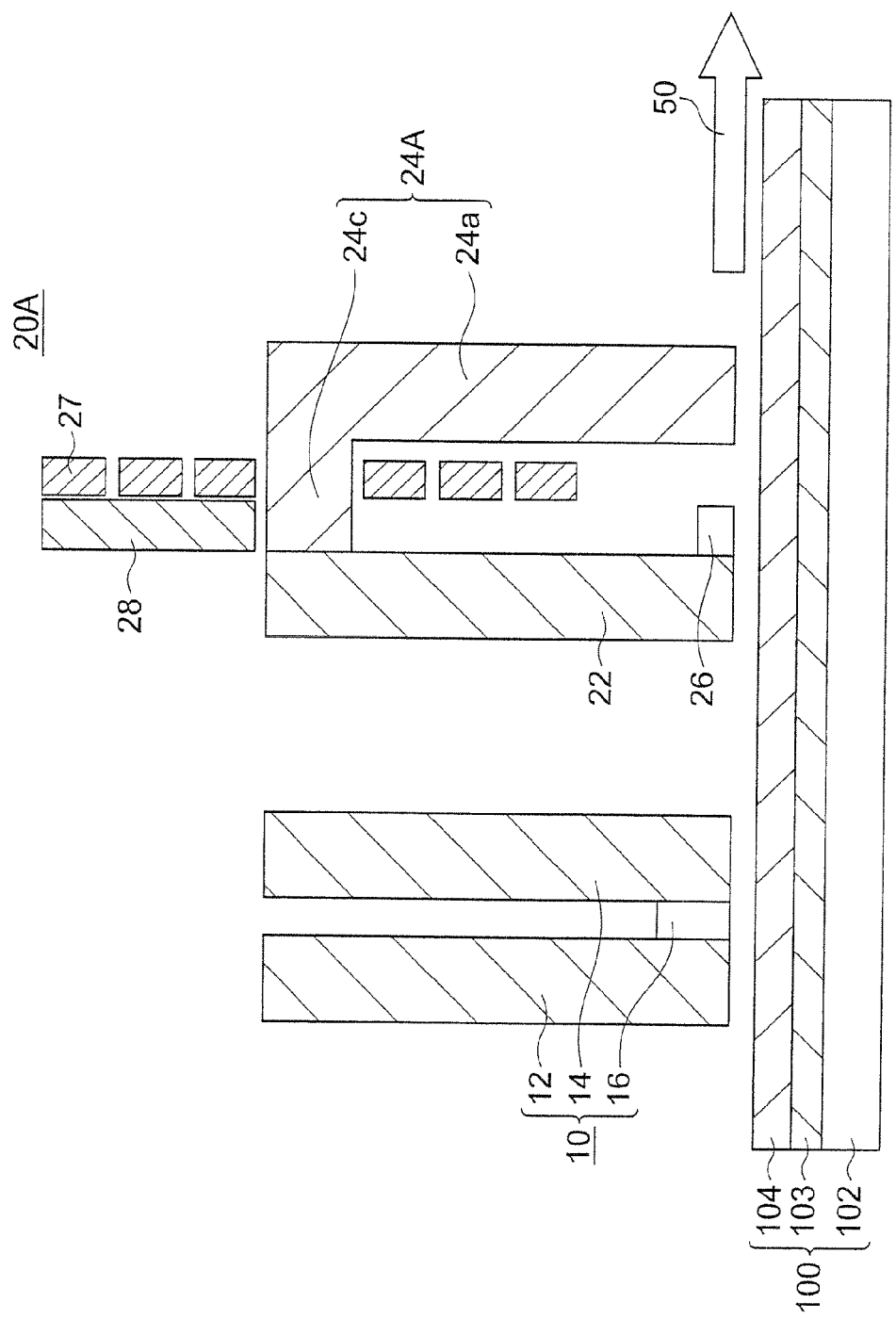
FIG. 12 is a cross-sectional view of a magnetic head according to a fourth modification of the first embodiment, taken in the track longitudinal direction.

FIG. 12 illustrates a magnetic head in accordance with a fourth modification of the first embodiment. FIG. 12 is a cross-sectional view of the magnetic head of this modification and a magnetic recording medium, taken along a plane in a direction (the track longitudinal direction) that is perpendicular to the surface of the magnetic recording medium and is parallel to the moving direction of the magnetic recording medium. The magnetic head of this modification differs from the first embodiment illustrated in FIG. 1, in that the writing head unit 20 is replaced with a writing head unit 20A of a single-pole structure. In this writing head unit 20A, the return yoke 24 of the first embodiment illustrated in FIG. 1 is replaced with a return yoke 24A that does not have the front portion (the shield) 24b. Accordingly, in this modification, the cross section taken along the plane in a direction (the track width direction) that is perpendicular to the air bearing surface and is perpendicular to the moving direction of the magnetic recording medium is exactly the same as the cross section of the first embodiment shown in FIG. 2.

In a magnetic recording head having a conventional single-pole structure, a perpendicular recording magnetic field is generated immediately below the main magnetic pole, but an insufficient diagonal recording magnetic field is generated in the magnetic recording medium. Therefore, it is preferable that a return yoke (a shield) is placed in the vicinity of the main magnetic pole. In a case where the electromagnet 28 is placed in the vicinity of the main magnetic pole 22 as in this modification (see FIG. 2), however, the in-plane magnetic field generated from the two magnetic poles of the electromagnet 28 is combined with the perpendicular recording magnetic field generated from the main magnetic pole 22, and a diagonal recording magnetic field is generated within the magnetic recording medium 100 accordingly. With this arrangement, the in-plane high-frequency magnetic field and the diagonal recording magnetic field can be combined with each other within the medium, without the return path (the shield) 24b. In a magnetic recording operation utilizing such a diagonal recording magnetic field, recording can be performed with a smaller magnetic field than the normal coercivity of the magnetic recording medium 100.

Like the first embodiment, this modification can also restrict the variation of the spin torque oscillator frequency due to a recording magnetic field.

Fifth Modification

Figure 13:
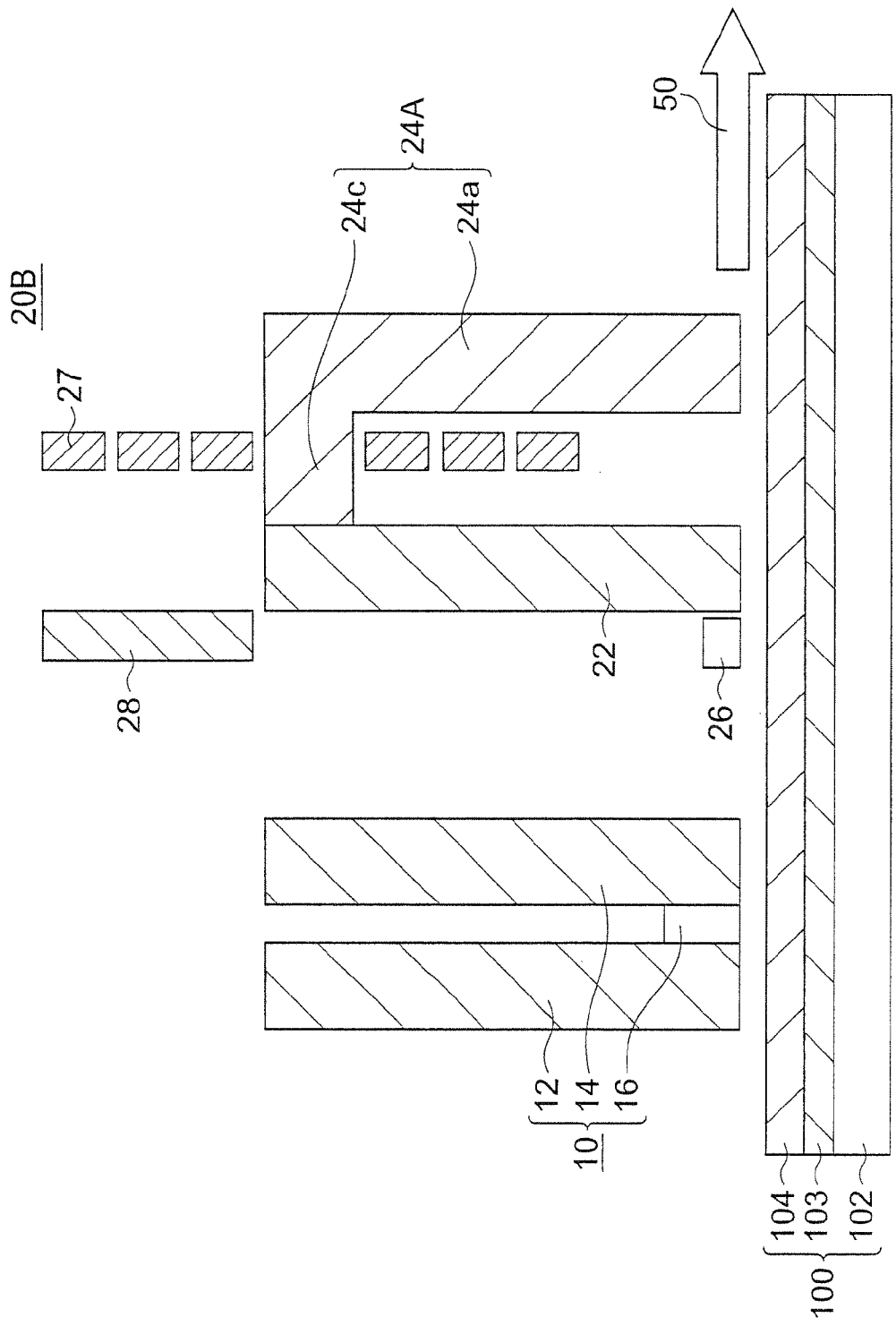
FIG. 13 is a cross-sectional view of a magnetic head according to a fifth modification of the first embodiment, taken in the track longitudinal direction.

FIG. 13 illustrates a magnetic head in accordance with a fifth modification of the first embodiment. FIG. 13 is a cross-sectional view of the magnetic head of this modification and a magnetic recording medium, taken along a plane in a direction (the track longitudinal direction) that is perpendicular to the surface of the magnetic recording medium and is parallel to the moving direction of the magnetic recording medium. The magnetic head of this modification differs from the magnetic head of the fourth modification shown in FIG. 12, in that the writing head unit 20A is replaced with a writing head unit 20B having the spin torque oscillator 26 placed on the leading side of the main magnetic pole 22. Accordingly, the electromagnet 28 is also placed on the leading side of the main magnetic pole 22.

In a magnetic recording operation utilizing a high-frequency assisted magnetic field, writing is performed at the portion at which the in-plane high-frequency magnetic field generated from the spin torque oscillator 26 is combined with the recording magnetic field generated from the main magnetic pole 22. Accordingly, in a magnetic recording operation utilizing a high-frequency assisted magnetic field, the magnetization information in the recording area with respect to the recording magnetic field generated from the main magnetic pole 22 is more stable than in a conventional magnetic recording operation. Thus, the spin torque oscillator 26 can be placed on the leading side of the main magnetic pole 22 as in this modification.

Figure 14:
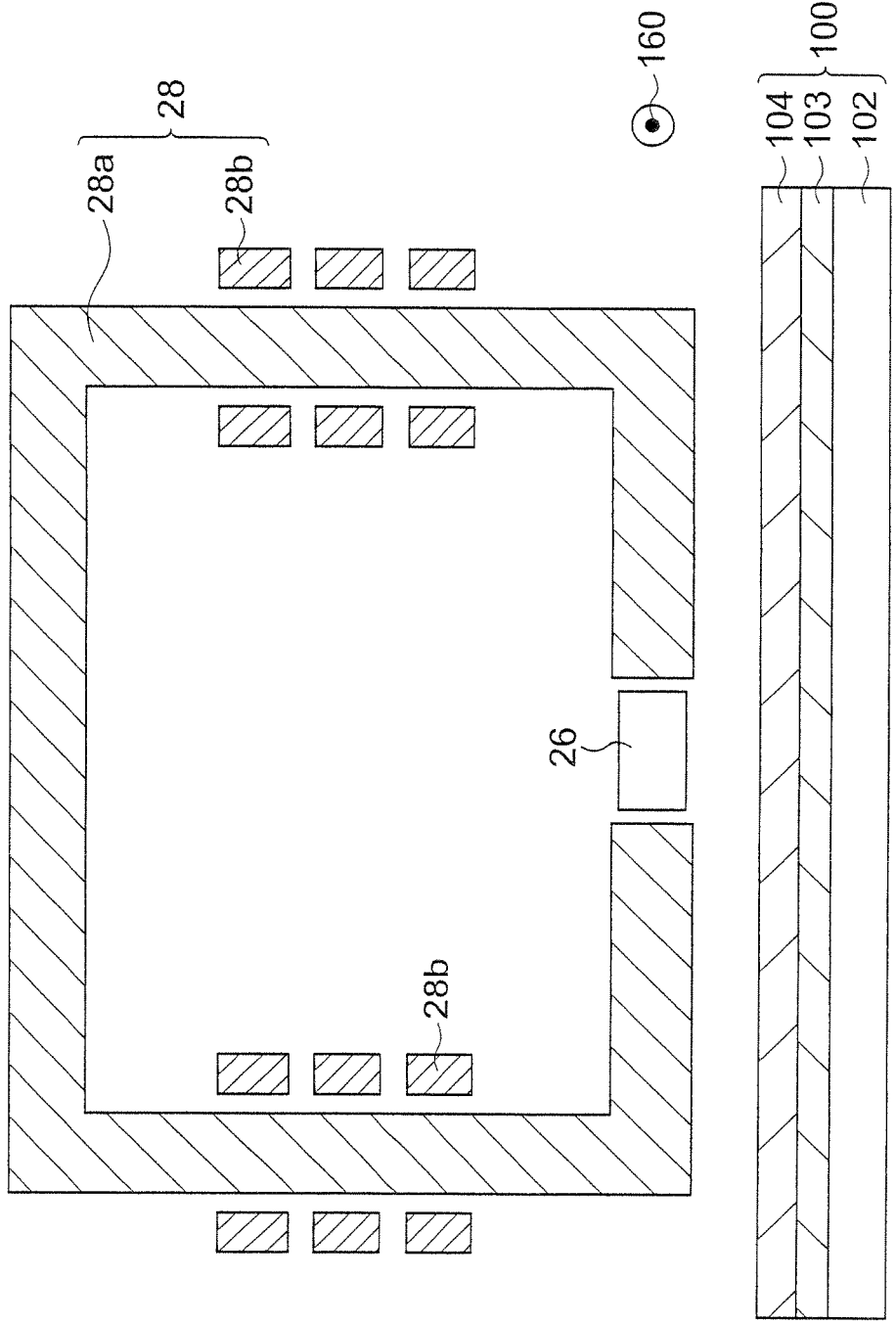
FIG. 14 is a cross-sectional view showing the positions of the electromagnetic coils in a magnetic head of the fifth modification.
Figure 15:
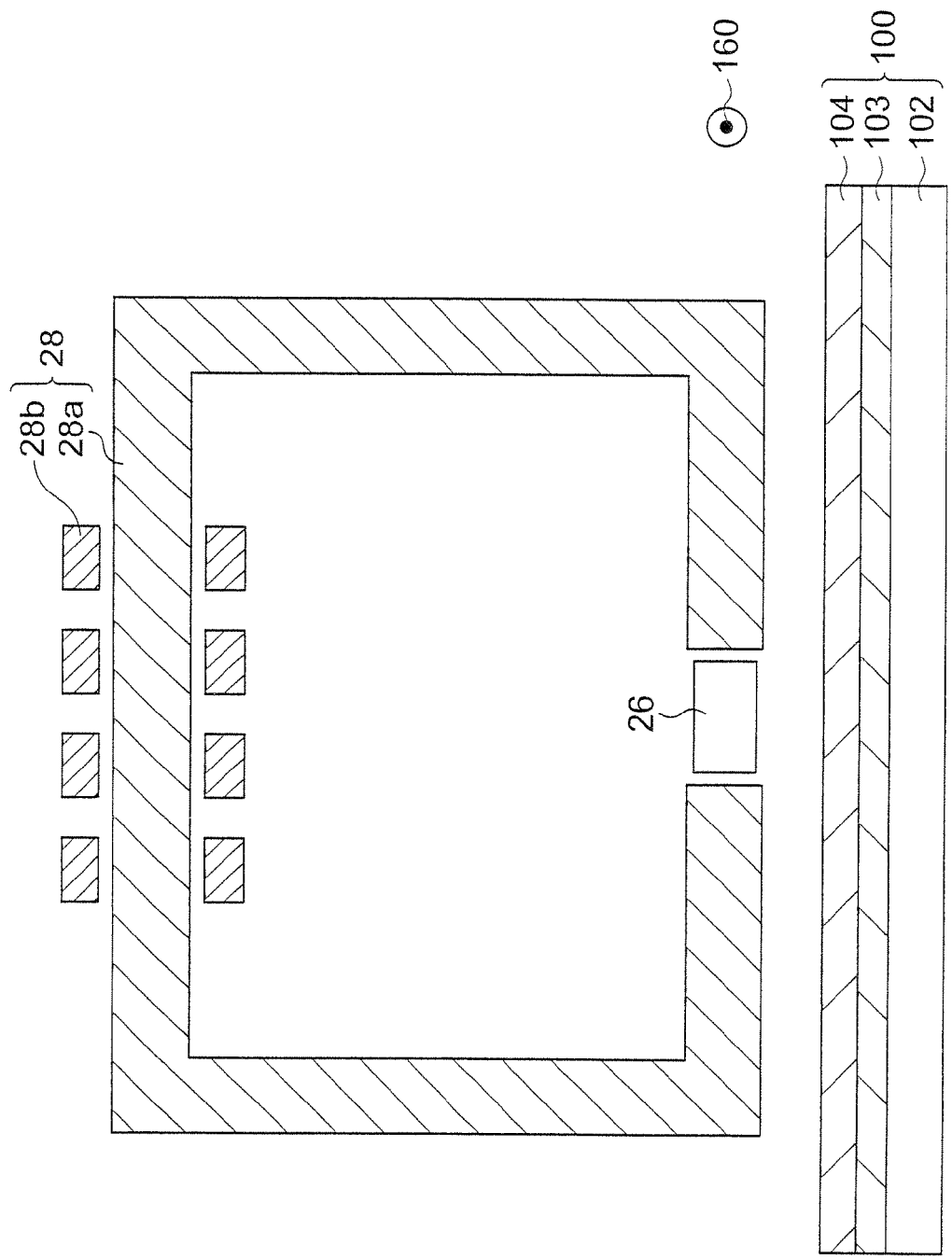
FIG. 15 is a cross-sectional view showing the position of the electromagnetic coil in a magnetic head of the fifth modification.

In this modification, the electromagnetic coils 28b of the electromagnet 28 may be designed to surround the two portions of the magnetic core 28a perpendicular to the air bearing surface of the spin torque oscillator, as shown in FIG. 14. Alternatively, the electromagnetic coil 28b may be designed to surround the portion of the magnetic core 28a that is the furthest away from the air bearing surface of the spin torque oscillator and is parallel to the air bearing surface, as shown in FIG. 15. FIGS. 14 and 15 are cross-sectional views of magnetic heads in accordance with this modification, taken along a plane in a direction (the track width direction) that is perpendicular to the air bearing surface of the spin torque oscillator and is perpendicular to the moving direction of the magnetic recording medium.

Like the first embodiment, this modification can also restrict the variation of the spin torque oscillator frequency due to a recording magnetic field.

Second Embodiment

Figure 16:
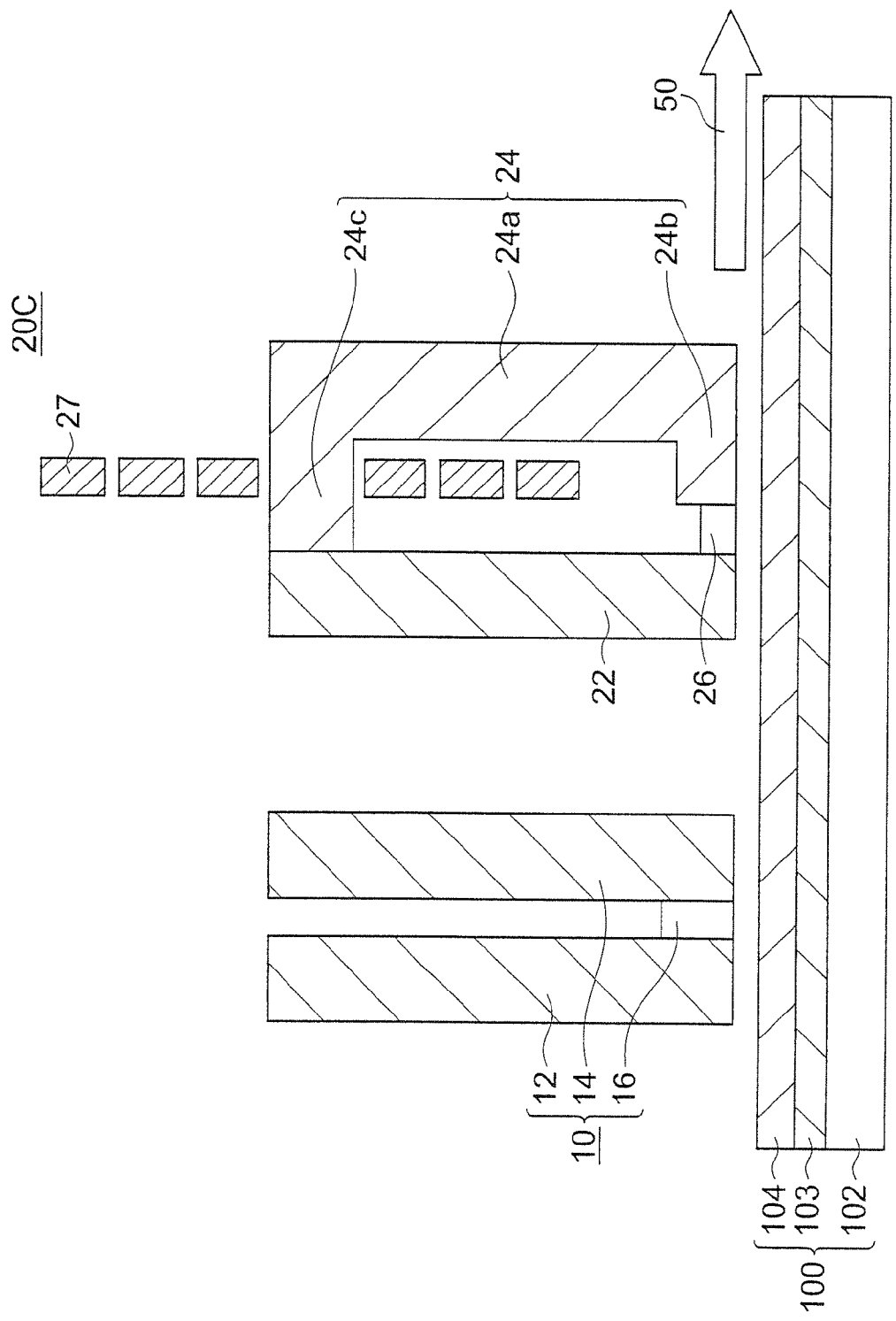
FIG. 16 is a cross-sectional view of a magnetic head according to a second embodiment of the present invention, taken in the track longitudinal direction.
Figure 17:
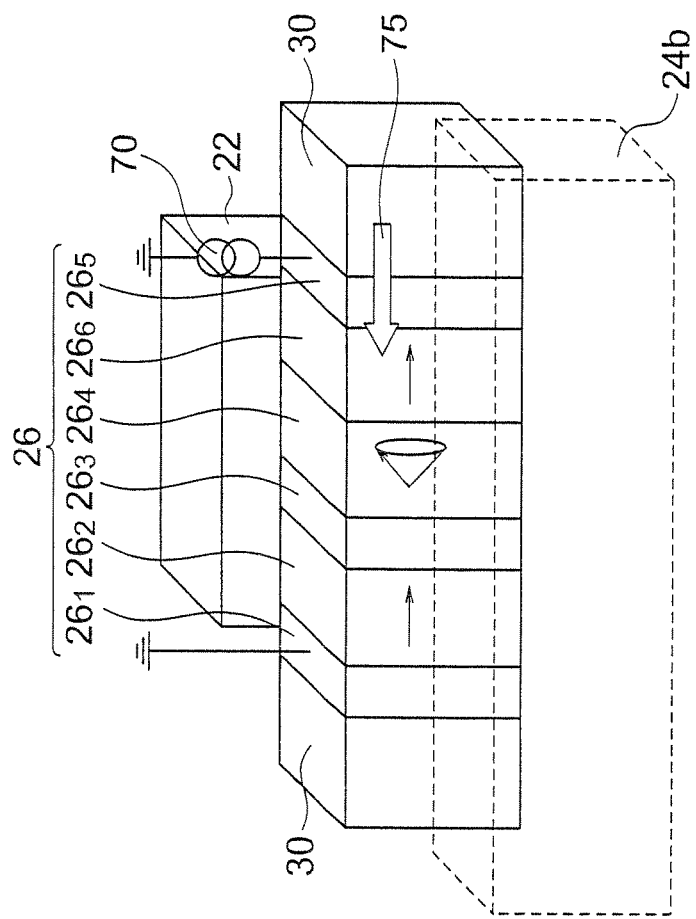
FIG. 17 is a perspective view showing a first specific example of the spin torque oscillator according to the second embodiment.
Figure 18:
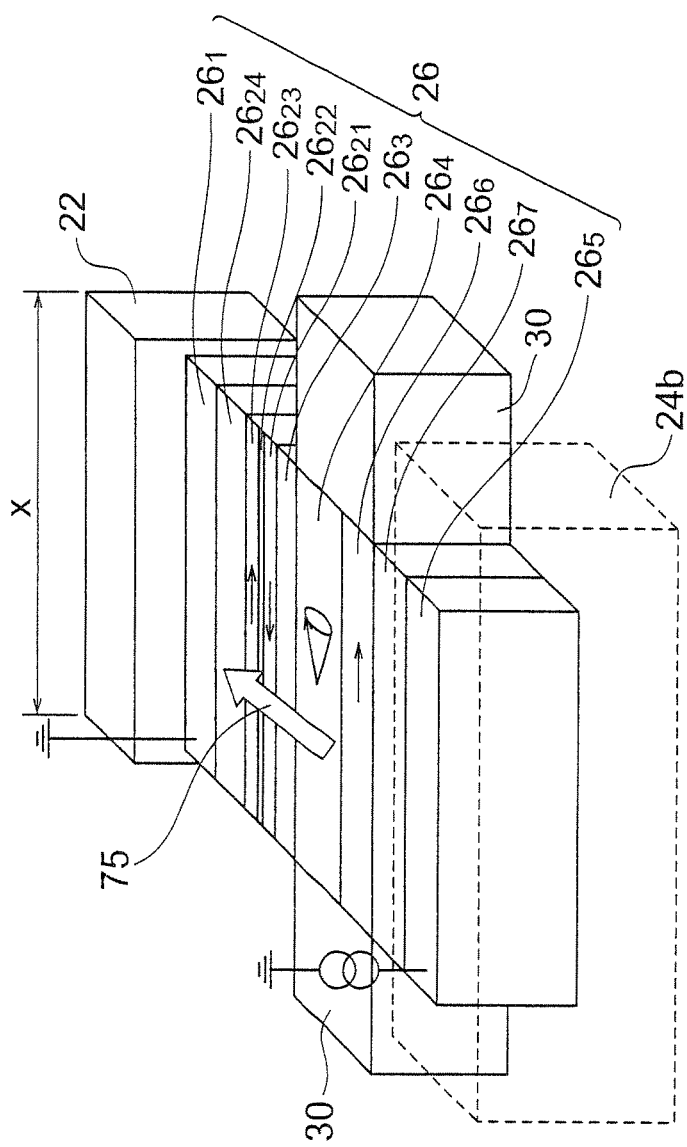
FIG. 18 is a perspective view showing a second specific example of the spin torque oscillator according to the second embodiment.

Referring now to FIGS. 16 to 18, a magnetic head in accordance with a second embodiment of the present invention is described.

FIG. 16 is a cross-sectional view of the magnetic head of this embodiment and a magnetic recording medium, taken along a plane in a direction (the track longitudinal direction) that is perpendicular to the air bearing surface and is parallel to the moving direction of the magnetic recording medium. FIGS. 17 and 18 are perspective views showing first and second specific examples of the spin torque oscillator of the magnetic head of this embodiment.

In a magnetic head of the first embodiment, a bias magnetic field is applied to the spin torque oscillator 26 by the electromagnet 28. In the magnetic head of this embodiment, however, a bias magnetic field is applied by hard bias film, instead of the electromagnet 28. More specifically, as shown in FIG. 16, in the magnetic head of this embodiment, the writing head unit 20 of the first embodiment shown in FIG. 1 is replaced with a writing head unit 20C that does not have the electromagnet 28. Instead of the electromagnet 28, a hard bias film 30 is provided outside the electrodes $26_1$ and $26_5$ of the spin torque oscillator 26, and a bias layer $26_6$ is provided between the electrode $26_5$ and the oscillator layer $26_4$ of the spin torque oscillator 26, as shown in FIGS. 17 and 18. Accordingly, the spin torque oscillator 26 includes the electrode $25_1$, the spin injection layer $26_2$, the intermediate layer $26_3$, the oscillator layer $26_4$, the bias layer $26_6$, and the electrode $26_5$.

The method of applying a bias magnetic field to the spin torque oscillator 26 by virtue of the hard bias film 30 as in this embodiment has the advantage that the resultant structure is simple and is easier to produce than a structure with an electromagnet. The bias layer $26_6$ of the spin torque oscillator 26 reinforces the magnetic field of the hard bias film 30, and is used to increase the magnetization of the oscillation layer $26_4$ and the spin injection layer $26_2$, and to increase the effective magnetic field in the track width direction by virtue of strong exchange coupling. Accordingly, if the bias magnetic field generated by the hard bias film 30 is sufficient, the bias layer $26_6$ is not necessary.

As shown in FIG. 17, in the first specific example of the spin torque oscillator 26, the film planes of the electrode $26_5$, the bias layer $26_6$, the oscillation layer $26_4$, the intermediate layer $26_3$, the spin injection layer $26_2$, and the electrode $26_1$ are substantially perpendicular to the recording air bearing surface and are substantially perpendicular to the direction of the magnetic field applied to the spin torque oscillator 26 by the hard bias film 30. The current generated from the constant current source 70 flows in the direction of the arrow 75, and is substantially parallel to the magnetic field applied by the hard bias film 30. In this first specific example, the magnetization directions of the spin injection layer $26_2$ and the bias layer $26_6$ are perpendicular to the film plane, and are parallel to each other.

As shown in FIG. 18, in the second specific example of the spin torque oscillator 26, the film planes of the electrode $26_5$, a base layer $26_7$, the bias layer $26_6$, the oscillation layer $26_4$, the intermediate layer $26_3$, the spin injection layer $26_2$, and the electrode $26_1$ are substantially perpendicular to the recording air bearing surface and are substantially parallel to the direction of the magnetic field applied to the spin torque oscillator 26 by the hard bias film 30. The spin injection layer $26_2$ has a stacked structure in which a spin injection film $26_{21}$, an intermediate film $26_{22}$, a spin injection film $26_{23}$, and an antiferromagnetic film $26_{24}$ are stacked in this order. The current generated from the constant current source 70 flows in the direction of the arrow 75, and is substantially perpendicular to the magnetic field applied by the hard bias film 30. The base layer $26_7$ is a Cr film of 5 nm in film thickness. The bias film 30 is a CoPt alloy film of 20 nm in film thickness. The oscillation layer $26_4$ is a stack film formed with a 2-nm thick CoFe alloy film and a 6-nm thick NiFe alloy film. The intermediate layer $26_3$ is a Cu film of 2 nm in film thickness. The spin injection film $26_{21}$ is a FeCo alloy film of 3 nm in film thickness. The intermediate film $26_{22}$ is a Ru film of 0.8 nm in film thickness. The spin injection film $26_{23}$ is a FeCo alloy film of 3 nm in film thickness. The antiferromagnetic film $26_{24}$ is an IrMn alloy film of 7 nm in film thickness. The hard bias film 30 is a stack film formed with a 5-nm thick Cr film and a 30-nm thick CoCrPt alloy film. In this second specific example, the magnetization directions of the spin injection film $26_{23}$, the spin injection film $26_{21}$, and the bias layer $26_6$ are parallel to the film plane, and are antiparallel to one another in the above order. This is because the spin injection film $26_{21}$, the intermediate film $26_{22}$, and the spin injection film $26_{23}$ form a stacked ferri-structure, and the ferromagnetic film $26_{24}$ applies an exchange coupling magnetic field to the spin injection film $26_{23}$ in a direction parallel to the film plane. This is also because the base layer $26_7$ causes the easy axis direction of the bias layer $26_6$ to be parallel to the film plane, and magnetization is performed so that the magnetization direction of the bias layer $26_6$ and the magnetization direction of the hard bias film 30 become parallel to the direction of the exchange coupling magnetic field generated by the antiferromagnetic film $26_{24}$. In FIG. 18, the core width x of the main magnetic pole 22 (the size of the main magnetic pole that is parallel to the recording air bearing surface and is parallel to the track width) is smaller than the core width of the spin torque oscillator 26. This is because, since writing on the recording medium is performed in the overlapping area of the recording magnetic field generated from the main magnetic pole 22 and the high-frequency magnetic field generated from the spin torque oscillator 26, the track width on the recording medium can be determined by the smaller core width of the spin torque oscillator 26. Further, by increasing the core width of the main magnetic pole 22, a greater recording magnetic field can be generated, and writing can be performed on a recording medium having higher coercivity.

As described above, the magnetic field applied to each of the first and second specific examples of the spin torque oscillator 26 by the hard bias film 30 is a magnetic field in a direction that is perpendicular to the magnetic field generated between the main magnetic pole 22 and the shield 24b in the track longitudinal direction (or is parallel to the track width). With this arrangement, the oscillation frequency can be stabilized, regardless of the direction of the writing magnetic field, as described above.

As in the first embodiment of the present invention, the spin injection layer $26_2$ and the bias layer $26_6$ may be formed with materials having excellent vertical orientation, including CoCr magnetic layers such as a CoCrPt layer, a CoCrTa layer, a CoCrTaPt layer, and a CoCrTaNb layer, CoPt or FePt alloy magnetic layers, and SmCo alloy magnetic layers. In this case, a base layer may be employed so as to control the magnetization direction of the magnetic layer to be perpendicular or parallel to the film plane. For example, to make the magnetization direction parallel to the film plane, it is possible to employ a nonmagnetic transition metal such as Cr, Ta, Ti, or W, or an alloy of those metals, or a stack film of those metals. Also, the spin injection layer $26_2$ and the bias layer $26_6$ may be formed with stacked structures including a ferromagnetic layer and an antiferromagnetic layer utilizing exchange coupling. In such a case, the ferromagnetic layer may be one of the above CoCr alloy layers, CoPt alloy layers, FePt alloy layers, and SmCo alloy layers, or a soft magnetic layer made of CoFe, CoNiFe, NiFe, CoZrNb, FeN, FeSi, or FeAlSi, or an alloy layer formed by adding Al, Si, Ge, Mn, or Cr to CoFe. The antiferromagnetic layer may be made of a material such as FeMn, NiMn, FeNiMn, FeMnRh, RhMn, CoMn, CrMn, CrMnPt, CrMnRh, CrMnCu, CrMnPd, CrMnIr, CrMnNi, CrMnCo, CrMnTi, PtMn, PdMn, PdPtMn, or IrMn. It is also possible to employ a stacked ferri-structure in which a ferromagnetic film, a nonmagnetic film, and a ferromagnetic film are stacked, or a stacked structure in which a stacked ferri-structure and an antiferromagnetic film are stacked. In such a case, the above described ferromagnetic layer can be used as the ferromagnetic films. It is preferable that a noble metal such as Cu, Pt, Au, Ag, Pd, or Ru is used for the nonmagnetic film. Also, a nonmagnetic transition metal such as Cr, Rh, Mo, or W can be used for the nonmagnetic film. The above described antiferromagnetic layer may be used for the antiferromagnetic film.

Next, modifications of this embodiment are described.

First Modification

Figure 19:
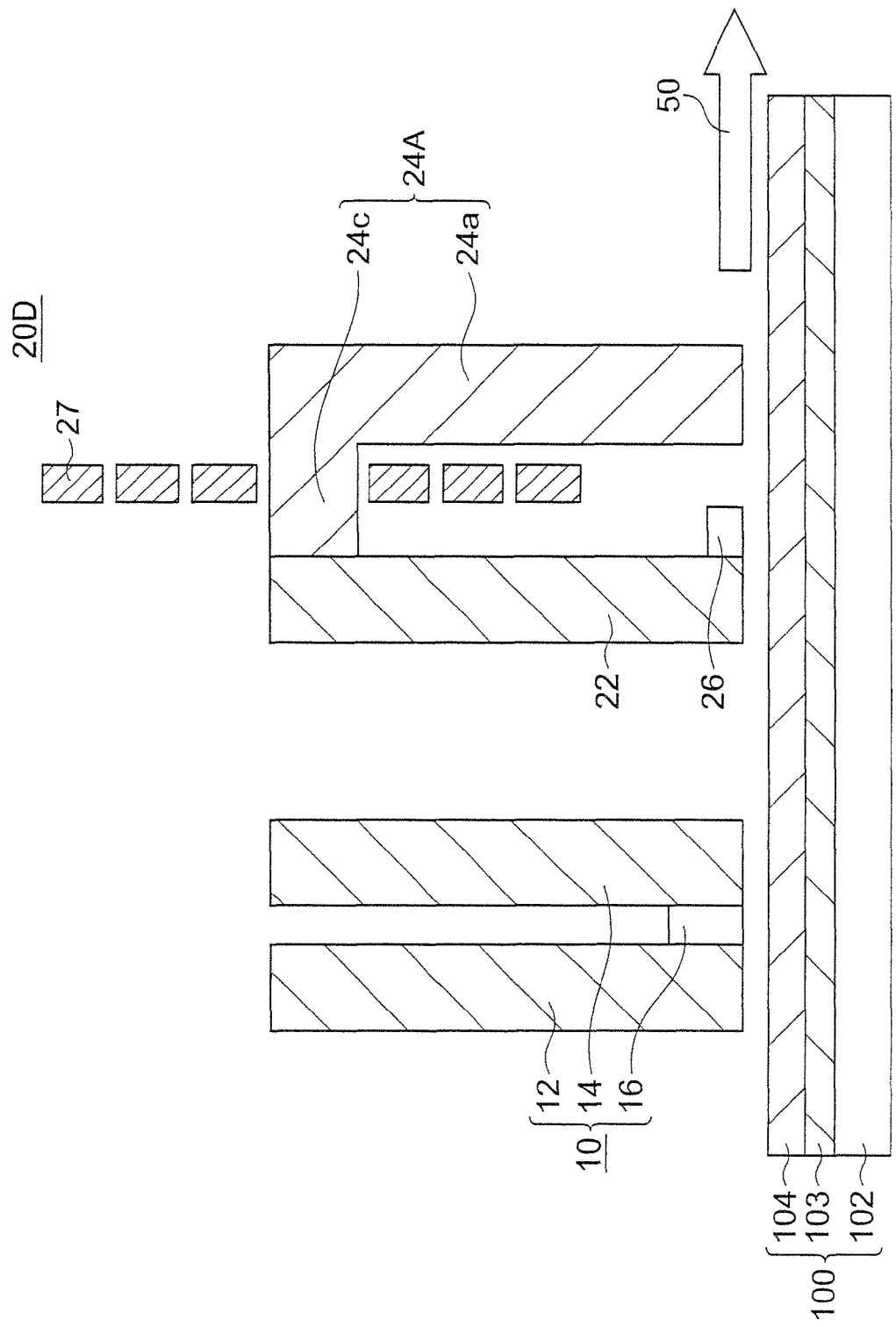
FIG. 19 is a cross-sectional view of a magnetic head according to a first modification of the second embodiment, taken in the track longitudinal direction.

FIG. 19 illustrates a magnetic head in accordance with a first modification of the second embodiment. FIG. 19 is a cross-sectional view of the magnetic head of this modification and a magnetic recording medium, taken along a plane in a direction (the track longitudinal direction) that is perpendicular to the air bearing surface and is parallel to the moving direction of the magnetic recording medium. In the magnetic head of this modification, the writing head unit 20C of the magnetic head of the second embodiment shown in FIG. 16 is replaced with a writing head unit 20D of a single-pole structure. In this writing head unit 20D, the return yoke 24 of the second embodiment shown in FIG. 16 is replaced with a return yoke 24A that does not have the front portion (the shield) 24b.

In a magnetic recording head having a conventional single-pole structure, a perpendicular recording magnetic field is generated immediately below the main magnetic pole, but an insufficient diagonal recording magnetic field is generated in the magnetic recording medium. Therefore, it is preferable that a return yoke (a shield) is placed in the vicinity of the main magnetic pole. In a case where the electromagnet 28 is placed in the vicinity of the main magnetic pole 22 as in this modification, however, the in-plane magnetic field generated from the two magnetic poles of the electromagnet 28 is combined with the perpendicular recording magnetic field generated from the main magnetic pole 22, and a diagonal recording magnetic pole is generated within the magnetic recording medium 100 accordingly. With this arrangement, the in-plane high-frequency magnetic field and the diagonal recording magnetic field can be combined with each other within the medium, without the return path (the shield) 24b. In a magnetic recording operation utilizing such a diagonal recording magnetic field, recording can be performed with a smaller magnetic field than the normal coercivity of the magnetic recording medium 100.

Like the second embodiment, this modification can also restrict the variation of the spin torque oscillator frequency due to a recording magnetic field.

Second Modification

Figure 20:
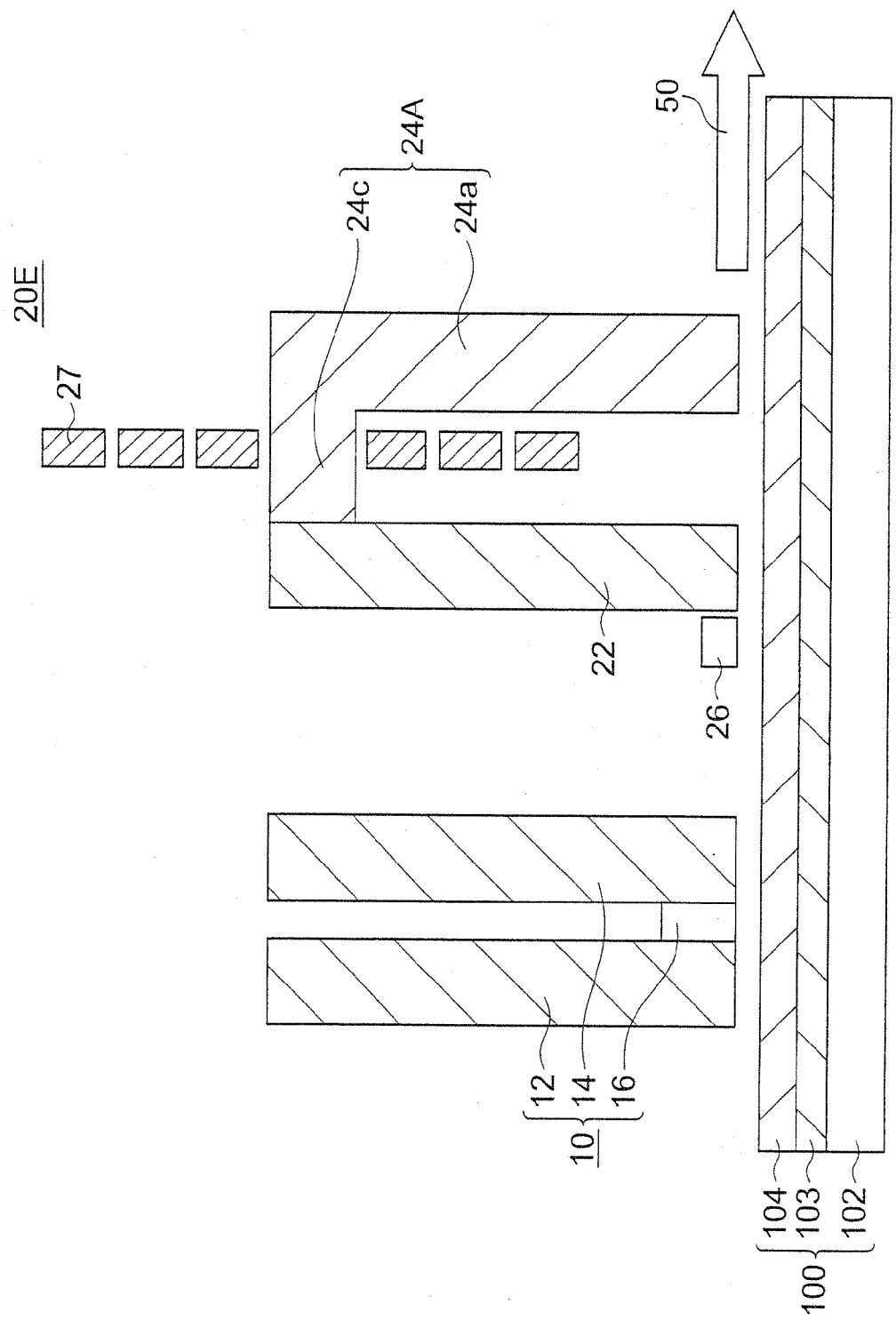
FIG. 20 is a cross-sectional view of a magnetic head according to a second modification of the second embodiment, taken in the track longitudinal direction.

FIG. 20 illustrates a magnetic head in accordance with a second modification of the second embodiment. FIG. 20 is a cross-sectional view of the magnetic head of this modification and a magnetic recording medium, taken along a plane in a direction (the track longitudinal direction) that is perpendicular to the air bearing surface and is parallel to the moving direction of the magnetic recording medium. The magnetic head of this modification differs from the magnetic head of the first modification shown in FIG. 19, in that the writing head unit 20D is replaced with a writing head unit 20E having the spin torque oscillator 26 placed on the leading side of the main magnetic pole 22.

In a magnetic recording operation utilizing a high-frequency assisted magnetic field, writing is performed at the portion at which the in-plane high-frequency magnetic field generated from the spin torque oscillator 26 is combined with the recording magnetic field generated from the main magnetic pole 22. Accordingly, in a magnetic recording operation utilizing a high-frequency assisted magnetic field, the magnetization information in the recording area with respect to the recording magnetic field generated from the main magnetic pole 22 is more stable than in a conventional magnetic recording operation. Thus, the spin torque oscillator 26 can be placed on the leading side of the main magnetic pole 22 as in this modification.

Like the second embodiment, this modification can also restrict the variation of the spin torque oscillator frequency due to a recording magnetic field.

As described above, each magnetic head of the first and second embodiments and their modifications includes a main magnetic pole (the recording magnetic pole), a spin torque oscillator formed in the vicinity of the main magnetic pole, and an electromagnet or a hard bias film for applying a magnetic field to the spin torque oscillator. The bias magnetic field generated from the electromagnet or the hard bias film is substantially perpendicular to the direction of the magnetic field generated from the main magnetic pole. More specifically, the magnetic poles of the electromagnet or the hard bias film is placed along the end portions in the track width direction, so that the bias magnetic field generated from the magnetic poles of the electromagnet or the hard bias film is applied in the track width direction. The electromagnet has a structure formed by winding a coil around a magnetic member having a closed magnetic path and a void therein. A large magnetic field is generated in the void in a direction perpendicular to the pole facing plane. In a case where the hard bias film is used, it is preferable that a pair of hard bias films are placed at the ends of the track width direction, so as to increase the uniformity and intensity of the bias magnetic field.

The spin torque oscillator has a stacked structure formed with an oscillator layer, an intermediate layer, and a spin injection layer. The spin torque oscillator also has electrodes and a direct current source for generating a driving current required for oscillations. In a case where the film planes of the respective layers are parallel to the moving direction of the magnetic recording medium, a spin injection layer having magnetization oriented in a direction perpendicular to the film planes is used, and a bias magnetic field is applied in the track width direction, so as to effectively cause oscillations in the magnetization of the oscillation layer. In a case where the film planes of the respective layers are parallel to the track width direction, a spin injection layer having magnetization oriented in the in-plane direction is used, and a bias magnetic field is applied in the track width direction, so that the magnetization of the oscillation layer oscillate effectively.

Here, to reduce the adverse influence of the magnetic body of the electromagnet or the magnetic field of the hard bias film on the magnetic recording medium located immediately below the electromagnet or the hard bias film, it is preferable that the magnetic body of the electromagnet or the hard bias film is placed further behind the air bearing surface, compared with the spin torque oscillator and the recording magnetic pole.

Third Embodiment

Next, a magnetic recording and reproducing device in accordance with the present invention is described. The magnetic head of each of the embodiments of the present invention and their modifications described with reference to FIGS. 1 to 20 can be incorporated into a magnetic head assembly of an integrated recording and reproducing type, and can be mounted on a magnetic recording and reproducing device.

Figure 21:
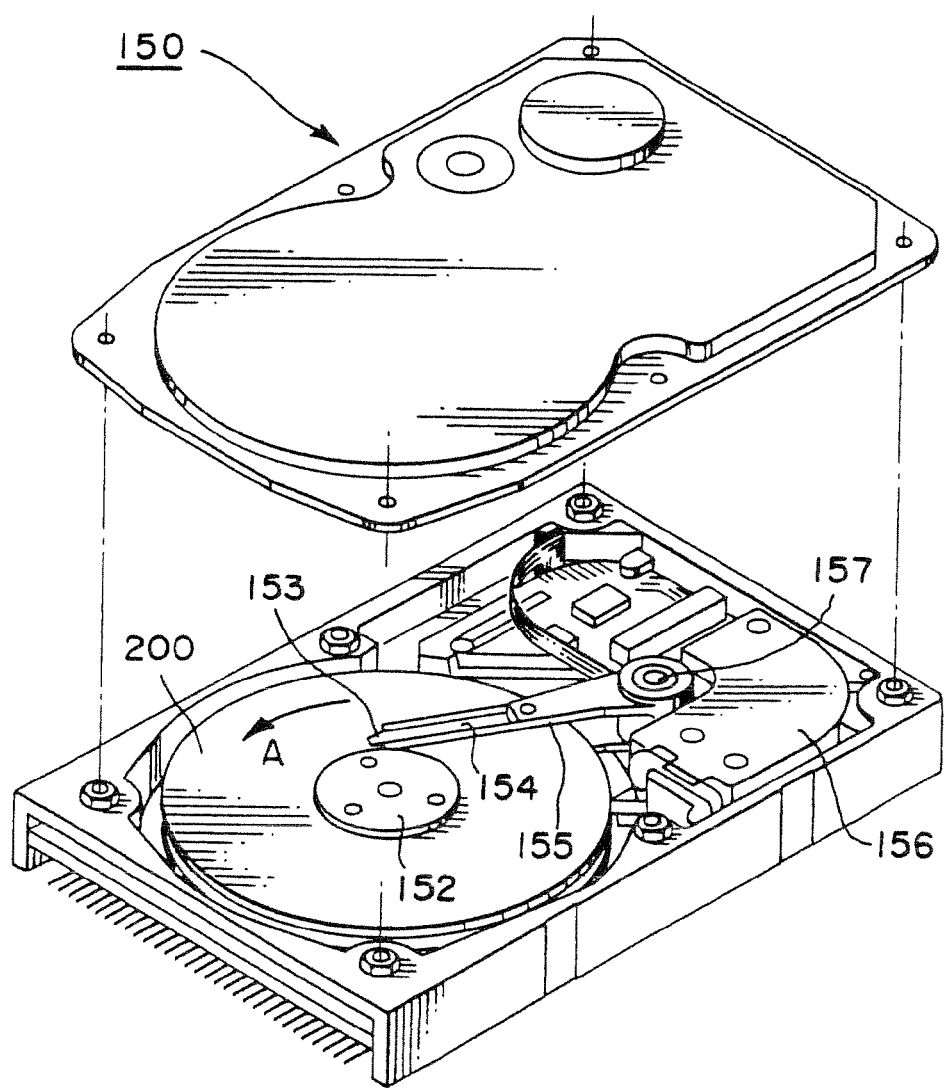
FIG. 21 is a perspective view of a magnetic recording and reproducing device according to a third embodiment of the present invention.

FIG. 21 is a schematic perspective view showing the components of such a magnetic recording device. The magnetic recording and reproducing device 150 of this embodiment is a device with a rotary actuator. In FIG. 21, a longitudinal-direction or vertical-direction recording magnetic disk 200 is mounted onto a spindle 152, and is rotated in the direction of the arrow A by a motor (not shown) that responds to a control signal supplied from a driving device controller (not shown). The magnetic disk 200 is a two-layer magnetic recording medium that has a perpendicular recording layer and a soft-magnetic backing layer. A head slider 153 that reproduces the information recorded on the magnetic disk 200 is attached to the top end of a thin-film suspension 154. Here, the head slider 153 has a magnetic head of one of the embodiments in the vicinity of the top end.

When the magnetic disk 200 is rotated, the air bearing surface (ABS) of the head slider 153 is maintained at a predetermined floating distance from the surface of the magnetic disk 200.

The suspension 154 is connected to one end of an actuator arm 155 that has a bobbin portion for holding a driving coil (not shown). A voice coil motor 156 that is a kind of a linear motor is attached to the other end of the actuator arm 155. The voice coil motor 156 is formed with the driving coil (not shown) wound around the bobbin portion of the actuator arm 155, and a magnetic circuit that includes a permanent magnet and a facing yoke that face each other and sandwich the driving coil.

The actuator arm 155 is held by ball bearings (not shown) provided at an upper portion and a lower portion of a fixed axis 157, and can freely rotate and slide by virtue of the voice coil motor 156.

Figure 22:
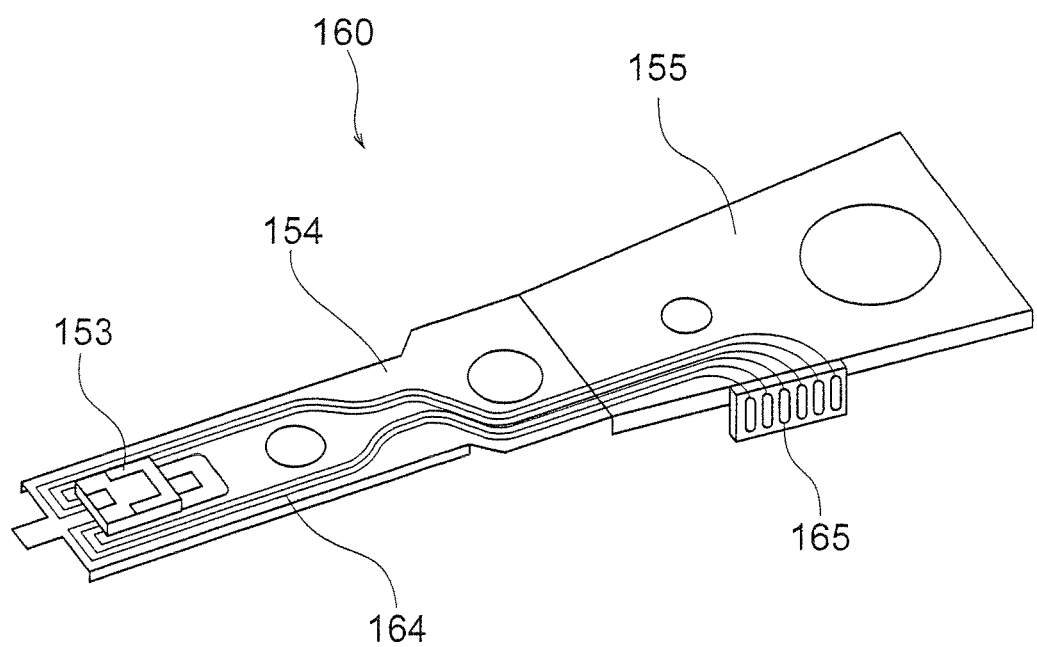
FIG. 22 is a perspective view of the top portions of the magnetic head assembly.

FIG. 22 is an enlarged perspective view of the top portions of the magnetic head assembly including the actuator arm 155, seen from the disk side. The magnetic head assembly 160 includes the actuator arm 155 having the bobbin portion for holding the driving coil, for example. The suspension 154 is connected to one end of the actuator arm 155.

The head slider 153 having one of the reproducing magnetic head described with reference to FIGS. 1 to 20 is attached to the top end of the suspension 154. The suspension 154 has lead lines 164 for the spin torque oscillator and for signal writing and reading. The lead lines 164 are electrically connected to the respective electrodes of the magnetic head incorporated into the head slider 153. In FIG. 22, reference numeral 165 indicates electrode pads of the magnetic head assembly 160.

Here, the predetermined floating distance is maintained between the air bearing surface (ABS) of the head slider 153 and the surface of the magnetic disk 200.

The embodiments of the present invention have been described so far by way of specific examples. However, the present invention is not limited to those specific examples. For example, magnetic recording media that can be used in the present invention are not limited to the magnetic recording medium 100 shown in FIGS. 1 to 20, and any magnetic recording medium having a recording layer and a soft magnetic layer can be used to achieve the same effects as the above described effects. More specifically, it is possible to use a discrete track medium that has tracks arranged in parallel with one another and nonmagnetic portions provided between the adjacent tracks, or a discrete bit medium that has magnetic bits and nonmagnetic portions provided between the magnetic bits.

Also, the materials and shapes of the components of magnetic heads are not limited to those described as the specific examples, and any materials and shapes that can be selected by those skilled in the art can be used to achieve the same effects as above.

Also, magnetic recording media that can be used in magnetic recording and reproducing devices are not limited to hard disks, but any other magnetic recording media such as flexible disks and magnetic cards can be used. Further, it is possible to employ a so-called "removable"-type device from which a magnetic recording medium can be detached.

Figure 23:
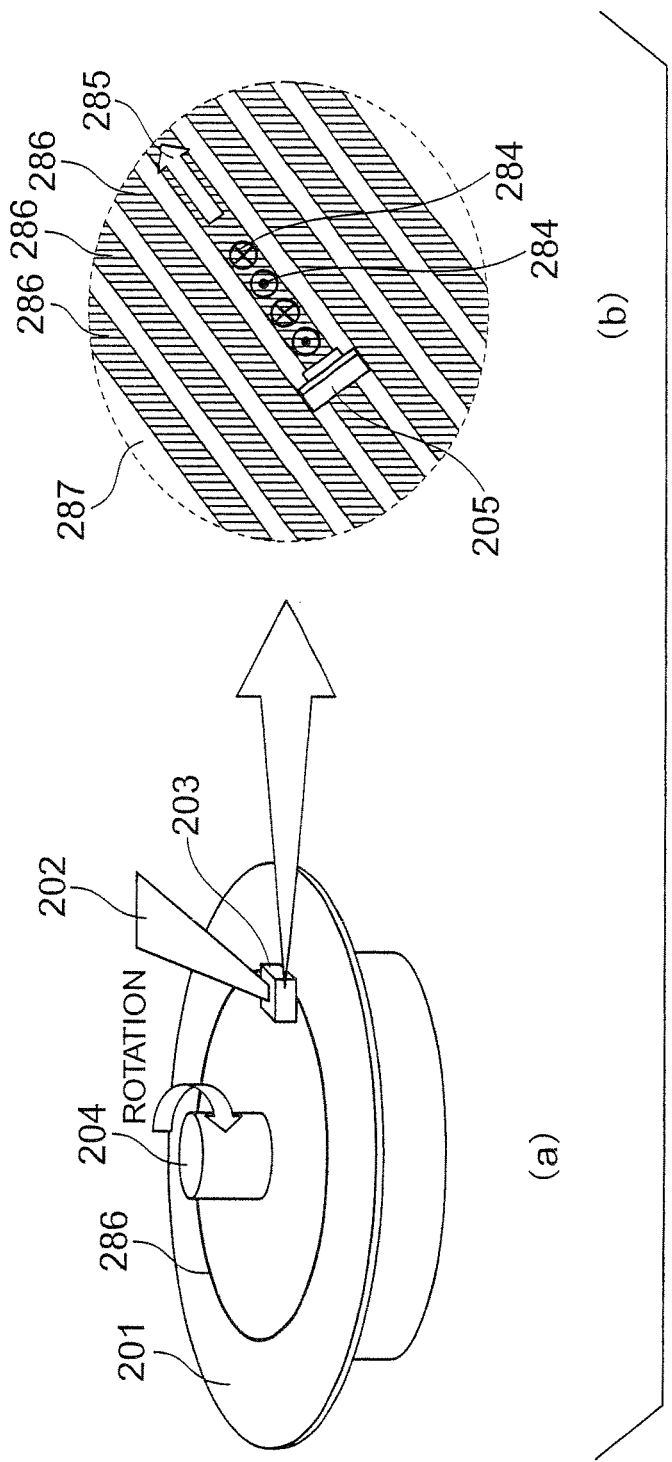
FIGS. 23(a) and 23(b) illustrate a discrete-track magnetic recording medium that can be used in each of the embodiments.

FIGS. 23A and 23B show a specific example of a magnetic recording medium that can be used in each of the above described embodiments. The magnetic recording medium 201 in this specific example is a discrete magnetic recording medium having multiparticle magnetic discrete tracks 286 that are separated from one another by nonmagnetic portions (or air portions) 287 and are vertically oriented. When this medium 201 is rotated by a spindle motor 204 and is moved in the medium running direction 285, recorded magnetized portions 284 can be formed by a magnetic recording head 205 mounted onto a head slider 203. The head slider 203 is attached to the top end of a suspension 202. This suspension 202 has lead lines for signal writing and reading, and the lead lines are electrically connected to the electrodes of the magnetic head 205 incorporated into the head slider 203.

The width (TS) of the spin oscillator in the recording track width direction is made equal to or greater than the width (TW) of each of the recording tracks 286 and equal to or smaller than the recording track pitch (TP), so that a decrease in the coercivity of the adjacent recording tracks due to the leakage high-frequency magnetic field generated from the spin oscillator can be effectively restricted. Accordingly, in the magnetic recording medium in this specific example, high-frequency assisted magnetic recording can be performed effectively only on desired recording tracks 286.

In this specific example, a high-frequency assisted recording device having narrow tracks and a high track density is more readily realized than in a case where a multiparticle vertical medium of a so-called "no-gap film type" is used. Also, in a conventional magnetic recording head, an unwritable medium magnetic material with high magnetic anisotropic energy (Ku), such as FePt or SmCo, is used according to the high-frequency assisted magnetic recording method, so as to further reduce the nanometer size of the medium magnetic particles. In this manner, a magnetic recording medium having a much higher line recording density in the recording track direction (the bit direction) than a conventional magnetic recording medium can be obtained.

Figure 24:
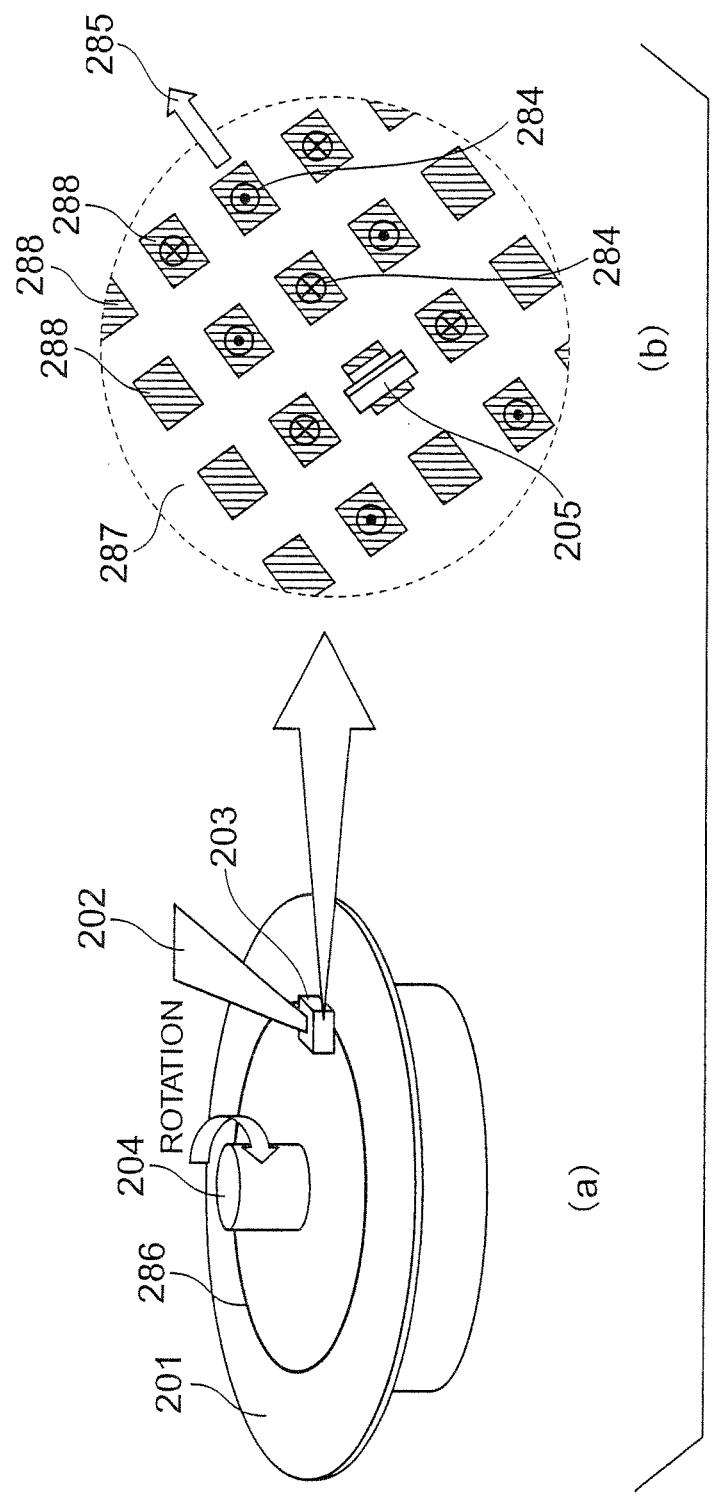
FIGS. 24(a) and 24(b) illustrate a discrete-bit magnetic recording medium that can be used in each of the embodiments.

FIGS. 24A and 24B are schematic views showing another example of a magnetic recording medium that can be used in each of the above embodiments. The magnetic recording medium 201 in this specific example is a discrete bit magnetic recording medium that has magnetic discrete bits 288 separated from one another by a nonmagnetic portion 287. When this medium 201 is rotated by the spindle motor 204 and is moved in the medium running direction 285, recorded magnetized portions 284 can be formed by the magnetic recording head 205 mounted onto the head slider 203.

As shown in FIGS. 23A through 24B, with any of the magnetic heads of the above described embodiments, recording can be accurately performed on the recording layer with high coercivity on the magnetic recording medium 201 of the discrete track type or the discrete bit type. Thus, high-density and high-speed magnetic recording can be performed.

In this specific example, the width (TS) of the spin oscillator in the recording track width direction is made equal to or greater than the width (TW) of each of the recording tracks 286 and equal to or smaller than the recording track pitch (TP), so that a decrease in the coercivity of the adjacent recording tracks due to the leakage high-frequency magnetic field generated from the spin oscillator can be effectively restricted. Accordingly, high-frequency assisted magnetic recording can be performed effectively only on desired recording tracks 286. With this embodiment, there is a possibility that a high-frequency assisted magnetic recording medium with a recording density of 10 Tbits/inch$^2$ or higher can be realized by giving high magnetic anisotropic energy (Ku) to the magnetic dots 288 and reducing the size of the magnetic dots 288, as long as the resistance to heat fluctuations is maintained in the usage environment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A magnetic head comprising:
    a recording magnetic pole to generate a recording magnetic field;
    a spin torque oscillator formed in the vicinity of the recording magnetic pole, the spin torque oscillator including:
        a magnetic layer comprising at least one magnetic film;
        a bias layer;
        an intermediate layer between the magnetic layer and the bias layer;
        an oscillation layer between the bias layer and the intermediate layer; and
        an electrode comprising a first electrode layer on a face of the magnetic layer on a side thereof opposite from the intermediate layer and between the magnetic layer and the recording magnetic pole, and a second electrode layer on a face of the bias layer on a side thereof opposite from the intermediate layer, the electrode being capable of applying a current flowing in a direction perpendicular to film planes of the magnetic layer, the intermediate layer, the oscillation layer, and the bias layer,
        the first electrode layer, the magnetic layer, the intermediate layer, the oscillation layer, the bias layer, and the second electrode layer being stacked in a direction from the recording magnetic pole to the first electrode layer,
    a hard bias film provided at both end portions of the bias layer and the oscillation layer in a direction perpendicular to a direction parallel to a line connecting the recording magnetic pole and the spin torque oscillator in a plane parallel to an air bearing surface, the hard bias film configured to apply a magnetic field to only the bias layer and the oscillation layer.

2. The head according to claim 1, further comprising
    a shield magnetically connected to the recording magnetic pole, and including a portion extending in a direction parallel to an air bearing surface of the recording magnetic pole.

3. The head according to claim 2, wherein the spin torque oscillator is between the shield and the recording magnetic pole.

4. A magnetic recording device comprising:
   a magnetic recording medium; and
   the magnetic head according to claim 1,
   wherein writing on the magnetic recording medium is performed with the use of the magnetic recording head.

5. The device according to claim 4, wherein the spin torque oscillator is on a trailing side of the recording magnetic pole.

6. The device according to claim 4, wherein the spin torque oscillator is on a leading side of the recording magnetic pole.

7. The device according to claim 4, wherein the magnetic recording medium comprises a discrete track medium including a plurality of tracks arranged in parallel with one another, and a nonmagnetic portion between the adjacent tracks.

8. The device according to claim 4, wherein the magnetic recording medium comprises a discrete bit medium including a plurality of magnetic dots, and a nonmagnetic portion between the magnetic dots.

9. The head according to claim 1, wherein the magnetic layer comprises a first spin injection film between the intermediate layer and the first electrode layer, an intermediate film between the first spin injection film and the first electrode layer, and a second spin injection film between the intermediate film and the first electrode layer.

10. The head according to claim 9, wherein the magnetic film further comprises an antiferromagnetic film between the second spin injection film and the first electrode layer.

* * * * *